United States Patent
Ninomiya et al.

[11] Patent Number: 5,940,029
[45] Date of Patent: Aug. 17, 1999

[54] RADAR APPARATUS

[75] Inventors: Teruhisa Ninomiya; Naofumi Okubo, both of Kawasaki, Japan

[73] Assignee: Fujitsu Limited, Kanagawa, Japan

[21] Appl. No.: 09/027,150

[22] Filed: Feb. 20, 1998

[30] Foreign Application Priority Data

Aug. 18, 1997 [JP] Japan .................................... 9-221372

[51] Int. Cl.[6] .............................. H01Q 3/22; H01Q 3/24; H01Q 3/26
[52] U.S. Cl. ........................... 342/372; 342/81; 342/154; 342/374
[58] Field of Search ............................ 342/81, 154, 372, 342/374; 455/277.1, 277.2

[56] References Cited

U.S. PATENT DOCUMENTS

| | | |
|---|---|---|
| 4,017,860 | 4/1977 | Earp . |
| 4,924,235 | 5/1990 | Fujisaka et al. . |
| 5,400,037 | 3/1995 | East ......................... 342/372 |
| 5,657,026 | 8/1997 | Culpepper et al. . |
| 5,684,451 | 11/1997 | Newman et al. ....................... 342/374 |

FOREIGN PATENT DOCUMENTS 0 707 220 A2  4/1996  European Pat. Off. .

*Primary Examiner*—Thomas H. Tarcza
*Assistant Examiner*—Dao L. Phan
*Attorney, Agent, or Firm*—Helfgott & Karas, PC

[57] ABSTRACT

An array antenna radar apparatus has a single front end shared by a plurality of antennas, a first switch for cyclically connecting the antennas to the front end at a prescribed switching frequency, and a second switch for cyclically connecting the output of the front end to frequency converters corresponding to the antennas. The frequency converters frequency-convert intermediate-frequency signals of the respective antennas output by the front end to baseband signals at the switching frequency. Phase shifters and amplitude adjusting units apply a phase shift or amplitude adjustment to the outputs of the frequency converters and combine the resulting signals, thereby making it possible to detect a target in a desired direction.

12 Claims, 27 Drawing Sheets

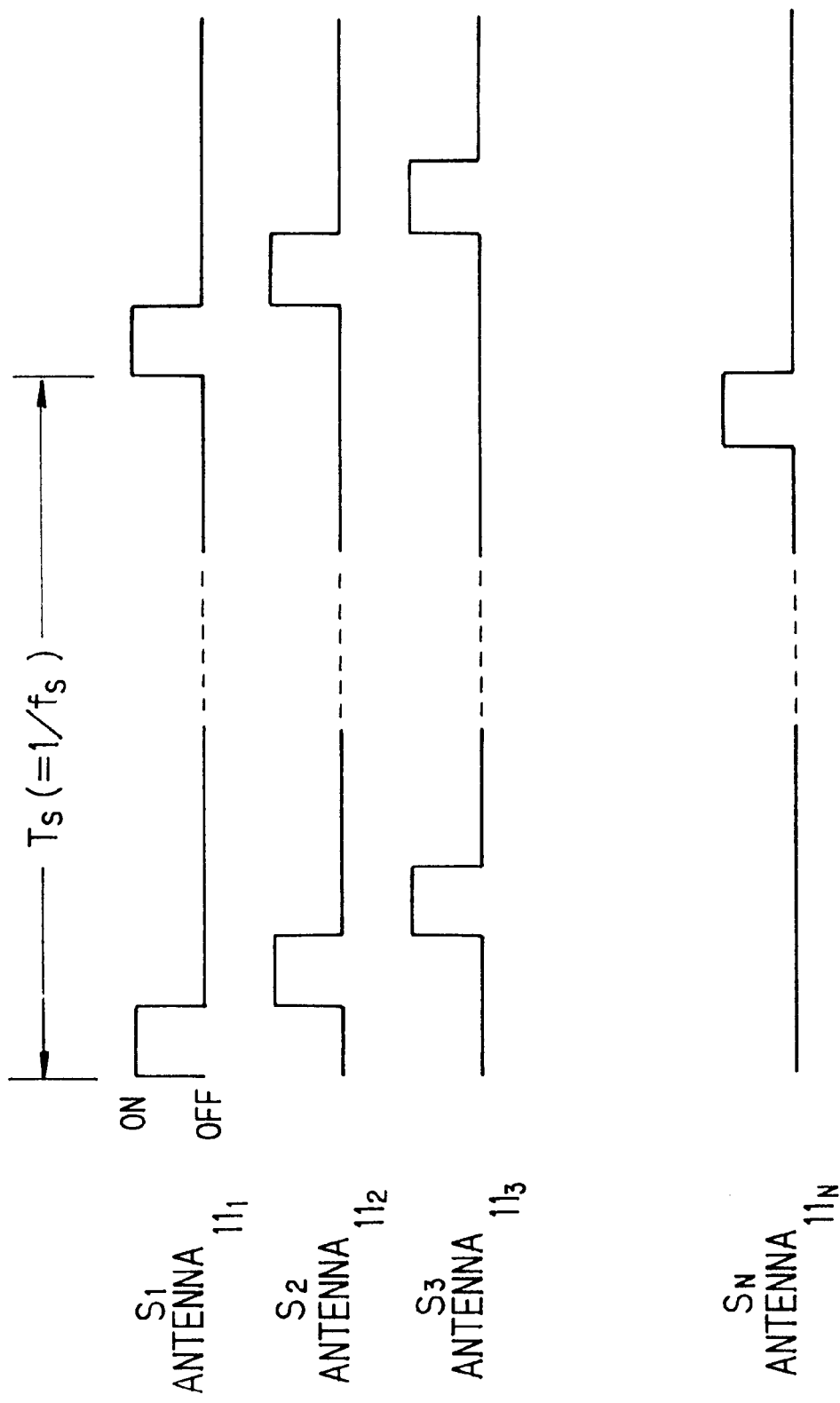

- $f_c$: RF
- $f_{Lo}$: RF LOCAL OSCILLATOR FREQUENCY
- $f_b$: BASEBAND FREQUENCY
- $f_s = 1/T_s$: SWITCHING FREQUENCY

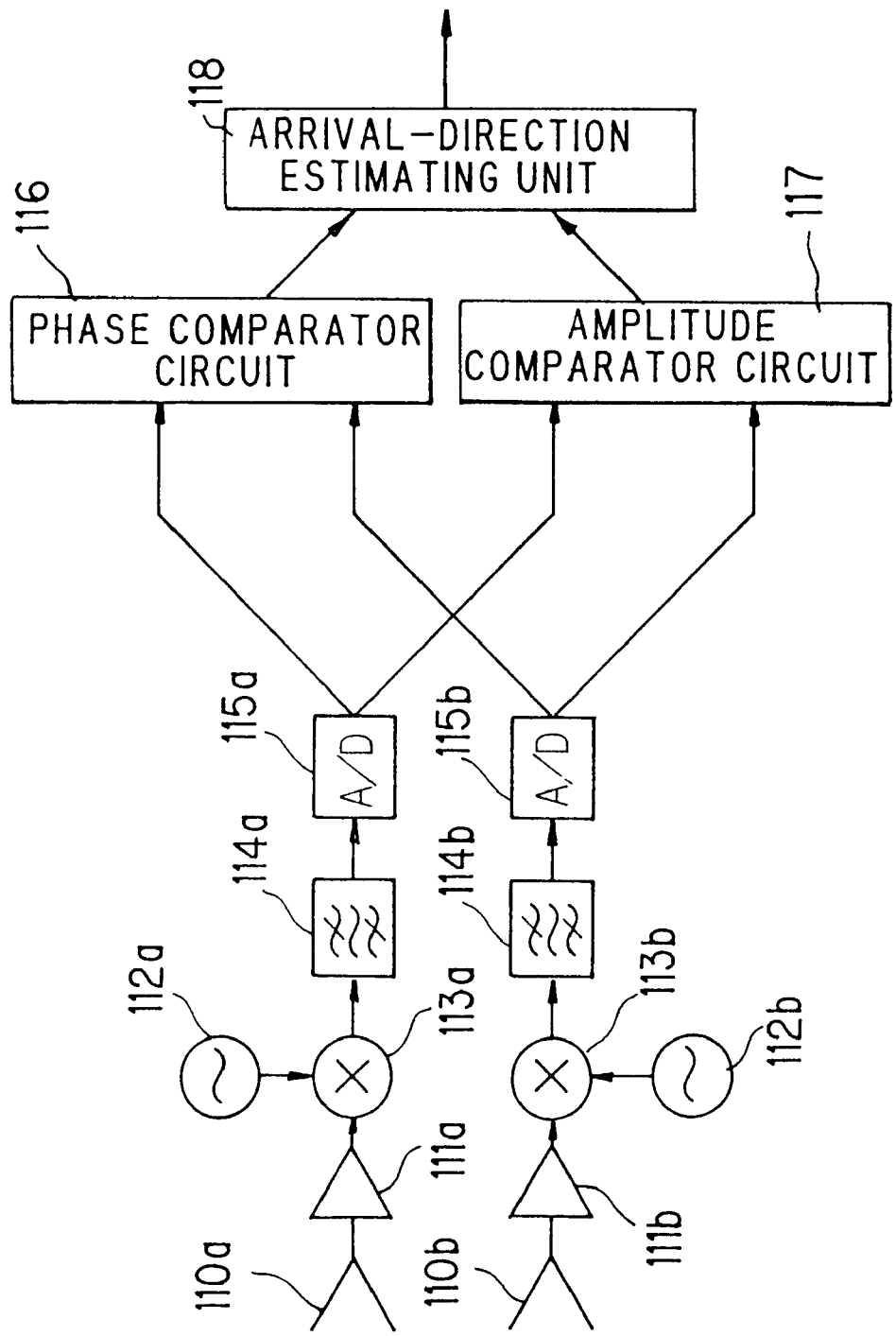

RADAR APPARATUS

BACKGROUND OF THE INVENTION

This invention relates to a radar apparatus equipped with a plurality of antennas and having a function for electronically controlling antenna beams. More particularly, the invention relates to a radar apparatus in which it is sufficient to provide one front end commonly for the antennas.

There are three conventional methods available for controlling an antenna beam. The first method involves changing the direction of the antenna mechanically. The second method involves switching among a plurality of antennas having different directivities. The third method entails arraying a number of antennas and combining the antenna radiation patterns electrically.

A number of problems arise with mechanical beam control. Specifically, the apparatus is large in size owing to the need for a drive unit. In a case where the antennas are integrated and the transceiver is heavy, the required accuracy cannot be obtained unless the drive unit used is complex and large in size. In addition, high-speed sweep is not possible. For these reasons, the selection made most often is electronic beam control means.

Methods of electronic beam control that can be mentioned are the aforementioned method of switching among a plurality of antennas having different directivities and the method of arraying a number of antennas and combining the antenna radiation patterns electrically. The former is referred to as beam switching. The latter is typified by an active phased array antenna in which transmission signals to individual antennas or reception signals from individual antennas are combined after being adjusted in terms of phase and amplitude. Consider a radar apparatus equipped with a receiver unit in which antenna beams are capable of being controlled.

A receiver unit of the beam-switching type (1) includes a switch connected directly to a plurality of antennas and adapted to switch among the antennas so as to connect them to a radio-frequency receiver (referred to as an "RF receiver circuit" below), which is the next stage, or (2) includes a plurality of antennas, RF receiver circuits connected directly to respective ones of these antennas, and a switch for switching among these RF receiver circuits so as to connect them to a processing unit, which is the next stage. With beam switching, the individual antennas are provided with directivities that differ from one another and the direction to be investigated by radar is controlled by switching among these antenna using an electronic switch. The RF receiver circuit subjects the received signal to low-noise amplification and frequency conversion. When the noise characteristic of the receiver is taken into consideration, the arrangement (2) mentioned above, namely that in which the antennas and RF receiver circuits are directly connected, is adopted.

As shown in FIG. 24, a receiver unit that employs the active phased array technique comprises a plurality of arrayed antennas 1a~1n, an RF receiver 2 having RF receiver circuits 2a~2n connected directly to the antennas 1a~1n, respectively, and an adder 10 for adding the signals from the RF receiver circuits 2a~2n in order to combine them. The RF receiver circuits 2a~2n function to amplify and frequency-convert the received signals from the respective antennas and to perform a phase shift and amplitude adjustment suited to a desired beam pattern.

The RF receiver 2 includes, in addition to the RF receiver circuits 2a~2n connected directly to the antennas, a phase control circuit 7 for deciding the amount of phase shift, an amplitude control circuit 8 for deciding the amount of amplitude adjustment, and a local oscillator 9. The RF receiver circuits 2a~2n respectively include RF amplifiers 3a~3n for low-noise amplification of RF signals received from the corresponding antennas, phase shifters 4a~4n for applying phase shifts of prescribed amounts $\phi_1$~$\phi_N$ to the corresponding low-noise amplified RF signals, amplitude adjusters 5a~5n for adjusting the amplitudes of the signals output by the corresponding phase shifters, and mixers (frequency converters) 6a~6n for converting the RF signals, which are output by the corresponding amplitude adjusters, to intermediate-frequency (IF) signals. The phase control circuit 7 and amplitude control circuit 8 decide the phase shift quantities $\phi_1$~$\phi_N$ and amplitude adjustment values $A_1$~$A_N$ so as to perform a phase shift and amplitude adjustment suited to the desired beam pattern, and input the phase shift quantities $\phi_1$~$\phi_N$ to the respective phase shifters 4a~4n and the amplitude adjustment values $A_1$~$A_N$ to the respective amplitude adjusters 5a~5n. The local oscillator 9 oscillates at a predetermined frequency and inputs the local oscillation signal to each of the mixers 6a~6n. The adder 10 combines the outputs of the mixers and inputs the result to a processor, which is not shown.

With the receiver unit that employs the active phased array technique, the combined radiation pattern is controlled by controlling the amount of phase shift and the amount of amplitude adjustment of each antenna reception signal, thus making it possible to change the direction of radar detection. Further, by changing the amount of phase shift and the amount of amplitude adjustment continuously, continuous control of the direction of radar detection also becomes possible.

The foregoing is an example of an analog configuration. However, by making use of digital technology, it is possible to realize a DBFN (Digital Beam Forming Network) having both digital and analog characteristics. A DBFN has a configuration similar to that of the active phased array arrangement, as illustrated in FIG. 25. The apparatus of FIG. 25 differs from that of FIG. 24 in that (1) the frequency converters 6a~6n and local oscillator 9 are disposed at the outputs of the RF amplifiers 3a~3n, (2) IF filters 101a~101n are provided for extracting intermediate-frequency components from the output signals of the frequency converters 6a~6n, respectively, (3) A/D converters 102a~102n are provided for converting the analog outputs of the IF filters to digital data, and (4) control of phase shift and amplitude is executed by digital processing using a DSP (Digital Signal Processor) or the like.

The DBFN-type receiver apparatus is so adapted that reception signals from the antennas 1a~1n are amplified by the RF amplifiers 3a~3n, respectively, and then subjected to a frequency conversion by the frequency converters 6a~6n, respectively. The IF filters 101a~101n extract intermediate-frequency components from the outputs of the frequency converters 6a~6n, respectively, and the A/D converters 102a~102n convert the IF signals to digital data. The DSP controls the amount of phase shift and adjusts amplitude by digital processing, and the adder 10 combines the resulting signals in terms of their vectors. As a result of this operation, a desired beam pattern is formed and the direction of detection is controlled. This is a principle exactly the same as that of the active phased array configuration described above.

Further, as shown in FIG. 26, an arrangement may be adopted in which a plurality of phase-shift/amplitude-adjustment means 103a~103m are provided, digital data output by the A/D converters 102a~102n is input to each of the phase-shift/amplitude-adjustment means 103a~103m, these input signals are subjected to separate phase shifts and amplitude adjustments by each of the phase-shift/amplitude-adjustment means 103a~103m and each of the phase-shift/amplitude-adjustment means 103a~103m combines the resulting signals and outputs the result. Adopting this arrangement makes it possible to form a plurality of emission patterns simultaneously so that signals from a plurality of directions can be distinguished among and obtained simultaneously. In the arrangement of FIG. 26, the active phased array technique and the beam switching technique can be realized at the same time. It should be noted that the reason for using digital circuitry is ease of design and manufacture.

A scheme in addition to the active phased array system that can be used to detect the direction of a target is the monopulse technique. Unlike the active phased array configuration, the monopulse scheme receives reflected power from a target by two antennas and compares the phases or amplitudes of the reflected power received by the two antennas to thereby estimate and detect the direction of the target (the signal arrival direction).

FIG. 27 is a diagram showing the construction of the receiver in a monopulse radar apparatus. The receiver includes antennas 110a, 110b, low-noise RF amplifiers 111a, 111b, local oscillators 112a, 112b, frequency converters 113a, 113b, IF filters 114a, 114b, A/D converters 115a, 115b for converting IF signals to digital data, a phase comparator circuit 116 for comparing the phases of signals received by the two antennas, an amplitude comparator circuit 117 for comparing the amplitudes of the signals received by the two antennas, and an arrival direction estimating circuit 118 for estimating the direction of a target (the signal arrival direction) based upon a phase difference or amplitude distance.

Though the two receiving antennas 110a, 110b point in substantially the same direction, the positions at which they are placed differ slightly. Consequently, the radiation beam patterns overlap with a slight offset between them. If the target is at equal distances from both antennas, the phases of the received signals that arrive at the two antennas 110a, 110b will be equal. If the target is closer to one antenna than the other, however, the signal arrival direction (the target direction) can be estimated from the phase difference between the two signals arriving at the respective antennas and the spacing between the antennas. The monopulse radar apparatus estimates the direction of the target in accordance with this principle.

The beam switching arrangement in which the antennas are switched among necessitates a plurality of independent antennas. It is required that the individual beam widths be comparatively small. In addition, depending upon the radar application, it is often required that the beam widths be uniformalized as well as the antenna gains. As a consequence, a plurality of antennas having comparatively large areas are required and, hence, the area occupied by the antennas is several times larger than that of a radar apparatus devoid of beam control or of a radar apparatus of the active phased array type. The cost of manufacturing the antenna components is high as well. Further, according to the beam switching system, control of detection direction is performed in discrete fashion by switching among the plurality of antennas having different directivities. As a result, the angular resolution of the target is limited by the beam widths of the individual antennas and the number of antennas.

With the active phased array and DBFN systems, a plurality of antenna radiation patterns are combined to obtain a single radiation pattern having the desired directivity. This means that it is unnecessary to enlarge the size of the antennas, as is required in the beam switching system. Further, by continuously varying the amount of phase shift and the amount of amplitude adjustment, continuous control of detection direction becomes possible, as set forth above. This makes it possible to increase angular resolution. However, the active phased array and DBFN systems require the individual RF receiver circuits for the plurality of antennas. This increases the size, complexity and manufacturing cost of the apparatus. Further, a manufacturing variance in the amplitude and phase characteristics specific to the circuitry and a manufacturing variance in the temperature and frequency characteristics of the circuit parameters become more pronounced at higher frequencies. This makes it necessary to take special care in apparatus design, and there are cases where compensating means and adjustment circuits must be provided. In the case of the multiple-beam DBFN arrangement (FIG. 26) having a plurality of beam combining means, a problem which arises is a more complicated apparatus.

Individual RF receiver circuits are necessary for the antennas in the monopulse arrangement as well, leading to a problem similar to that seen with the active phased array configuration.

SUMMARY OF THE INVENTION

Accordingly, a first object of the present invention is to provide a radar apparatus in which an RF receiver circuit (front end) need not be provided for each antenna, it sufficing to provide only a single front end commonly for each of the antennas.

A second object of the present invention is to provide a radar apparatus composed of fewer required components, in which only one front end need be provided commonly for the antennas.

A third object of the present invention is to provide a radar apparatus in which only one front end need be provided commonly for the antennas even in a case where the antennas are used for both transmission and reception.

In accordance with the present invention, the first object is attained by providing an array antenna radar apparatus having a plurality of antennas, adjusting circuits provided in correspondence with respective ones of the antennas for adjusting phase or amplitude of input signals to the adjusting circuits, and a combining circuit for combining signals that have been adjusted in phase or amplitude by the adjusting circuits, the radar apparatus comprising (1) a front end provided commonly for the antennas for amplifying signals, which have been received by the antennas, successively input thereto, and for frequency-converting the amplified signals to intermediate-frequency signals, (2) a first switch for cyclically connecting the antennas to the front end at a prescribed switching frequency, (3) frequency converters provided in correspondence with respective ones of the antennas for frequency-converting the intermediate-frequency signals output by the front end to other intermediate-frequency signals or baseband signals at the above-mentioned switching frequency, (4) a second switch, which is switched in synchronization with the first switch, for connecting the output of the front end to whichever of the frequency converters corresponds to an ith antenna when the signal received by the ith antenna is entering the front end, and (5) intermediate-frequency filters provided between the second switch and respective ones of the frequency converters, wherein a target lying in a desired direction is detected by adjusting the phase or amplitude of an output from each frequency converter and combining the signals that result.

In accordance with the present invention, the second object is attained by providing an array antenna radar apparatus having a plurality of antennas, adjusting circuits provided in correspondence with respective ones of the antennas for adjusting phase or amplitude of input signals to the adjusting circuits, and a combining circuit for combining signals that have been adjusted in phase or amplitude by the adjusting circuits, the radar apparatus comprising (1) a front end provided commonly for the antennas for amplifying signals, which have been received by the antennas, successively input thereto, and for frequency-converting the amplified signals to intermediate-frequency signals, (2) a switch for cyclically connecting the antennas to the front end at a prescribed switching frequency, (3) A/D converters provided in correspondence with respective ones of the antennas for A/D-converting signals output by the front end, and (4) a sampling control circuit for causing whichever of the A/D converters corresponds to an ith antenna to sample and A/D-convert the output signal of the front end when the signal received by the ith antenna is entering the front end, wherein a target lying in a desired direction is detected by adjusting the phase or amplitude of an output signal from each A/D converter and combining the signals that result.

In accordance with the present invention, the second object is attained by providing an array antenna radar apparatus having a plurality of antennas, adjusting circuit provided commonly for the antennas for adjusting phase or amplitude of input signals to the adjusting circuit, and a combining circuit for combining signals that have been adjusted in phase or amplitude by the adjusting circuit, the radar apparatus comprising (1) a front end provided commonly for the antennas for amplifying signals, which have been received by the antennas, successively applied thereto, and for frequency-converting the amplified signals to intermediate-frequency signals, (2) a switch for cyclically connecting the antennas to the front end at a prescribed switching frequency, (3) an A/D converter for A/D-converting intermediate-frequency signals output by the front end, and (4) means for causing the A/D converter to A/D convert an output signal of the front end at a frequency obtained by multiplying the switching frequency by the number of the plurality of antennas, and for storing, as a signal corresponding to an ith antenna, an A/D converted output prevailing when the signal received by the ith antenna is entering the front end, wherein a target lying in a desired direction is detected by adjusting the phase or amplitude of an output signal, which corresponds to each antenna, from the A/D converter, and combining the signals that result.

In accordance with the present invention, the third object is attained by providing a radar apparatus having antennas each of which is for both transmission and reception, and a third switch for alternately switching an antenna, which has been selected by a first switch, to a transmitter circuit and a front end.

Other features and advantages of the present invention will be apparent from the following description taken in conjunction with the accompanying drawings.

BRIEF DESCRIPTION OF THE DRAWINGS

FIG. 2 is a time chart illustrating antenna switching timing;

FIG. 27 is a diagram showing the construction of the receiver section of a monopulse radar apparatus.

DESCRIPTION OF THE PREFERRED EMBODIMENTS

Figure 1:
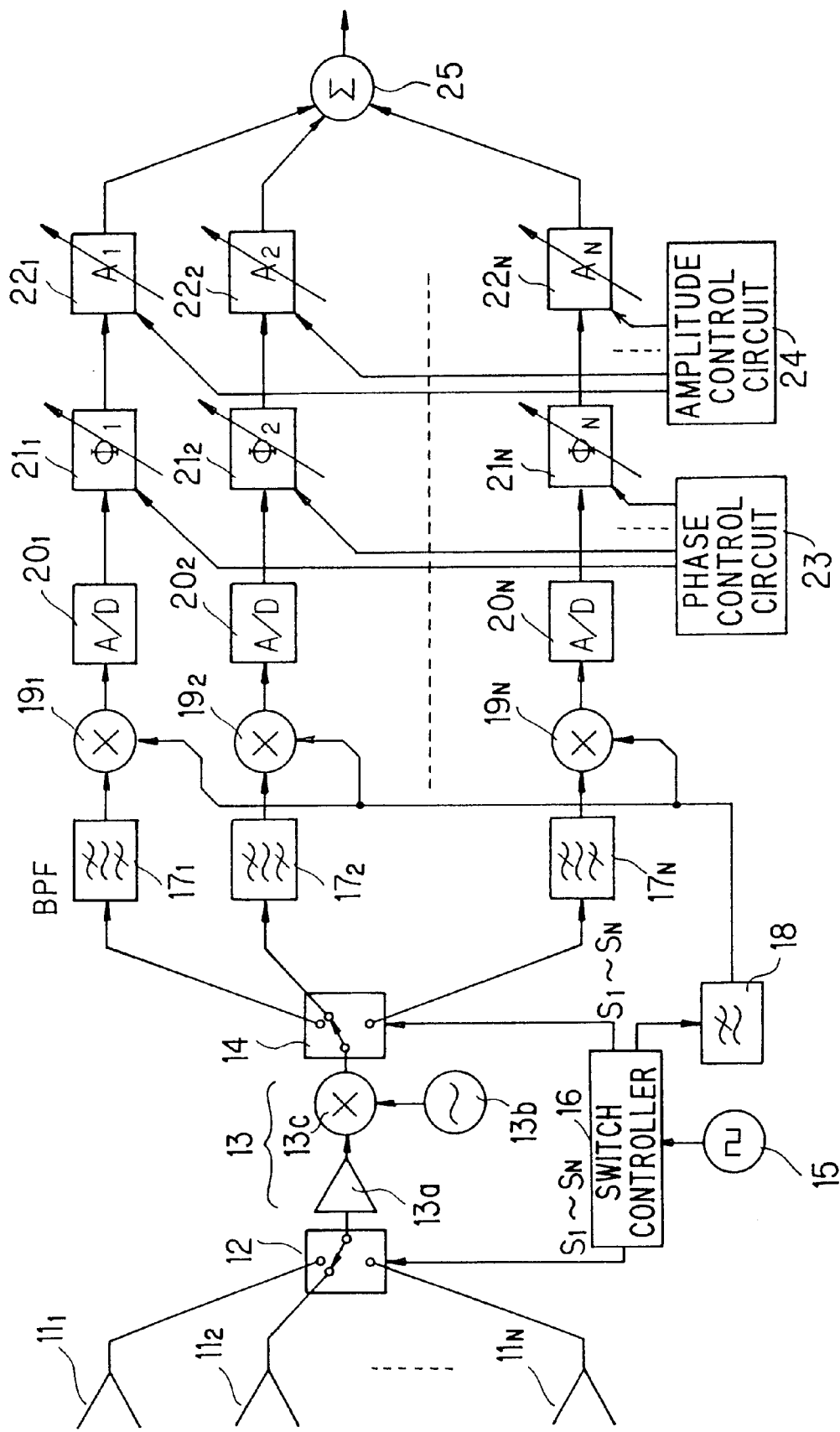
FIG. 1 is a diagram showing the construction of a radar apparatus according to a first embodiment of the present invention.

(A) Overview of the Invention (a) Overview of first aspect (see FIG. 1)

The present invention provides an array antenna radar apparatus having a plurality of antennas $11_1 \sim 11_N$, adjusting circuits $21_1 \sim 21_N$, $22_1 \sim 22_N$ provided in correspondence with respective ones of the antennas $11_1 \sim 11_N$ for adjusting phase or amplitude of input signals applied thereto, and a combining circuit 25 for combining signals that have been adjusted in phase or amplitude by the adjusting circuits. The radar apparatus further includes (1) a front end 13 provided commonly for the antennas $11_1 \sim 11_N$ for amplifying signals, which have been received by the antennas, successively applied thereto, and for frequency-converting the amplified signals to intermediate-frequency signals, (2) a first switch 12 for cyclically connecting the antennas $11_1 \sim 11_N$ to the front end 13 at a prescribed switching frequency, (3) frequency converters $19_1 \sim 19_N$ provided in correspondence with respective ones of the antennas $11_1 \sim 11_N$ for frequency-converting the intermediate-frequency signals output by the front end 13 to other intermediate-frequency signals or baseband signals at the above-mentioned switching frequency, (4) a second switch 14, which is switched in synchronization with the first switch 12, for connecting an output of the front end 13 to a frequency converter $19_i$ that corresponds to an ith antenna when the signal received by the ith antenna $11_i$ is entering the front end 13, and (5) intermediate-frequency filters $17_1 \sim 17_N$ provided between the second switch 14 and respective ones of the frequency converters $19_1 \sim 19_N$, wherein a target lying in a desired direction is detected by adjusting the phase or amplitude of an output from each frequency converter and combining the signals that result.

If this arrangement is adopted, the array antenna radar apparatus need be provided with only the single front end 13 shared by the antennas $11_1 \sim 11_N$. This makes it possible to simplify the arrangement and to dispense with compensating means and adjustment circuits required in the prior art.

Figure 7:
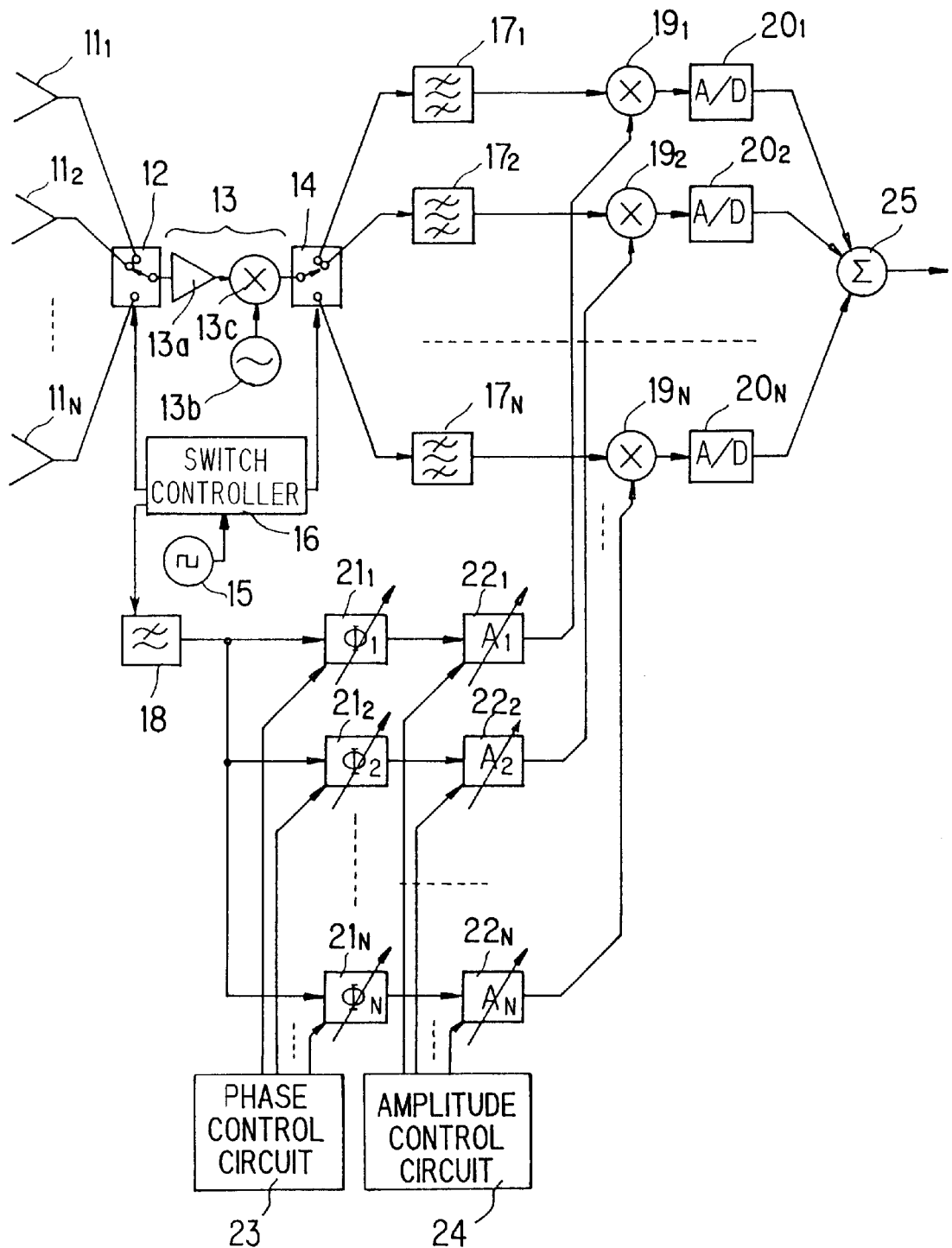
FIG. 7 is a diagram showing a radar apparatus according to a second modification of the present invention.

(b) Overview of second aspect (see FIG. 7)

The radar apparatus according to the present invention further includes a local oscillator 15 for outputting a local oscillation signal having a frequency identical with the frequency at which the antennas $11_1 \sim 11_N$ are connected to the front end 13. Adjusting circuits $21_1 \sim 21_N$, $22_1 \sim 22_N$ provided between the local oscillator 15 and respective ones of the frequency converters $19_1 \sim 19_N$ for adjusting phase or amplitude of the local oscillation signal. The local oscillation signals adjusted in phase or amplitude by each of the adjusting circuits enter the respective frequency converters $19_1 \sim 19_N$. The latter output signals whose phase or amplitude has been adjusted.

The output of each frequency converter reflects the phase or amplitude of the local oscillation signal. Accordingly, by shifting the phase and adjusting the amplitude of the local oscillation signal, it is possible to obtain an effect identical with that obtained by shifting the phase and adjusting the amplitude of the intermediate-frequency signal or baseband signal. In accordance with the radar apparatus of the present invention, therefore, the phase/amplitude adjusters can be placed at any appropriate location, thereby making it possible to provide radar apparatus having a variety of configurations.

Figure 6:
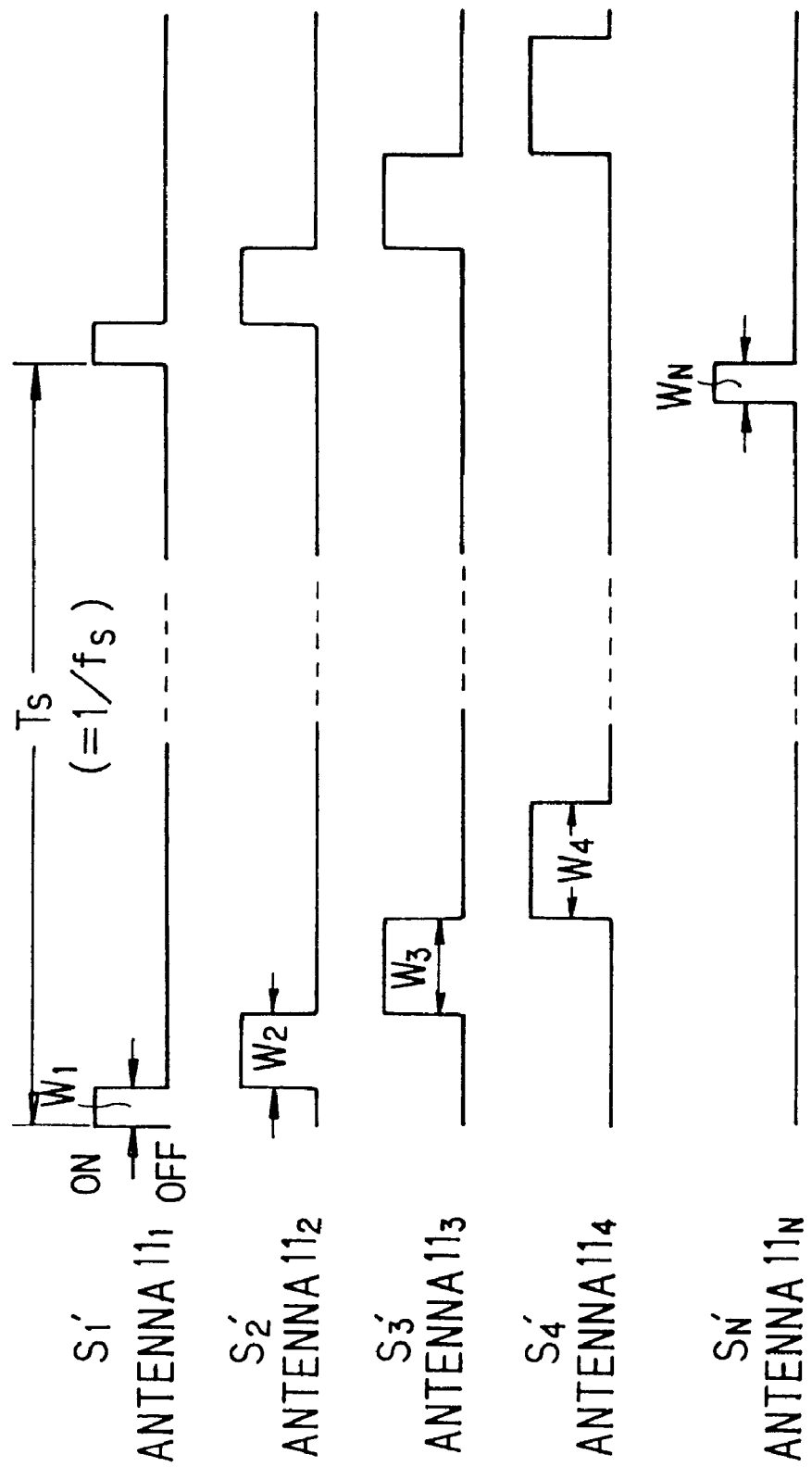
FIG. 6 is a diagram useful in describing switch-on times of amplitude control.

(c) Overview of third aspect (see FIG. 6)

In the radar apparatus according to this aspect of the present invention, the amplitude adjusters $22_1 \sim 22_N$ adjust the lengths of time (the ON times of the first and second switches) the antennas $11_1 \sim 11_N$ are connected to the front end 13 and the lengths of time the output of the front end is connected to the frequency converters $19_1 \sim 19_N$ corresponding to these antennas, thereby applying an amplitude adjustment to the outputs of the frequency converters. If this arrangement is adopted, the amplitude adjustment can be performed by a simple arrangement.

Figure 17:
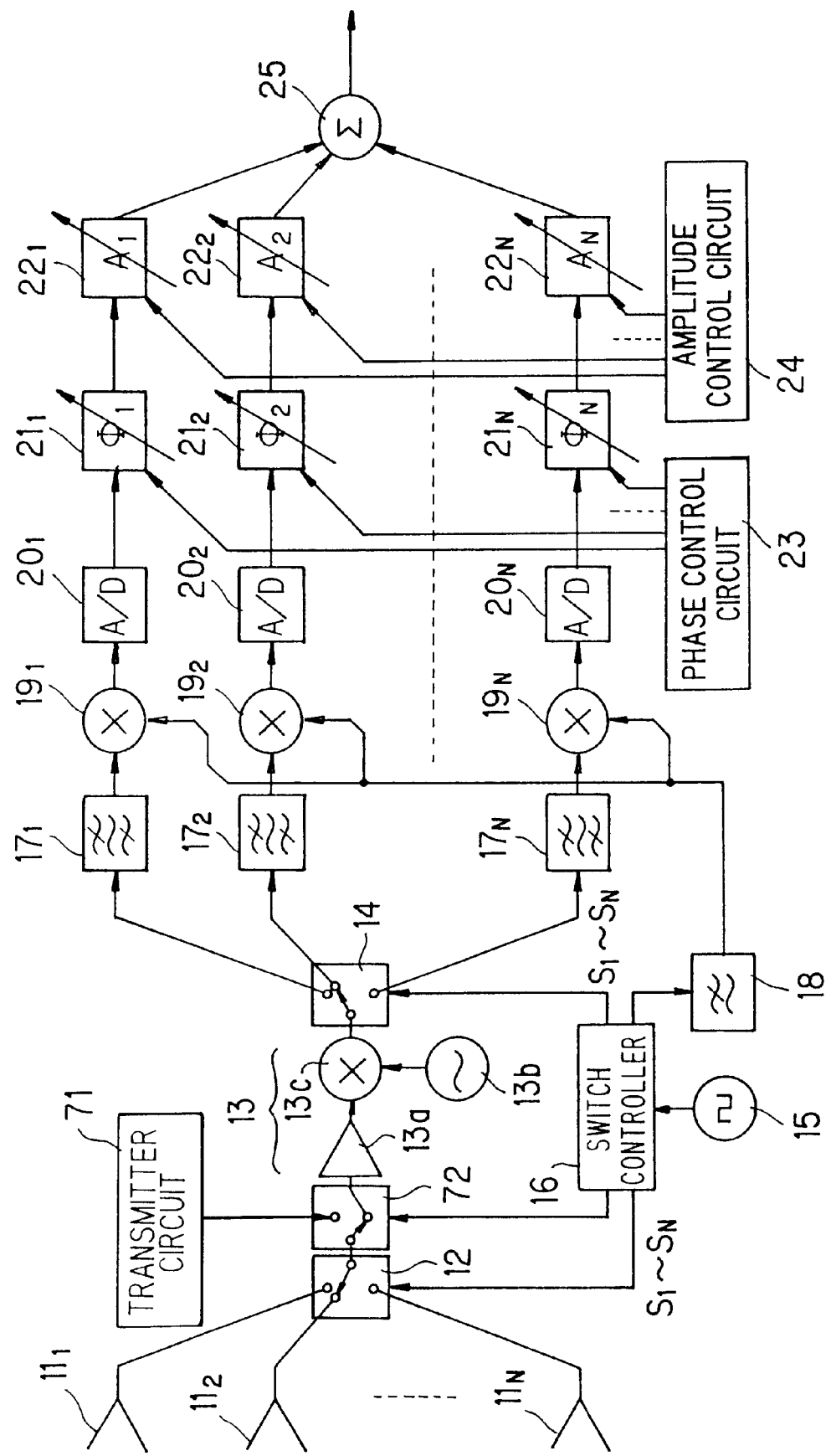
FIG. 17 is a diagram showing the construction of a radar apparatus according to a fourth embodiment for a case where all antennas are used for both transmission and reception.

(d) Overview of fourth aspect (see FIG. 17)

In the radar apparatus according to this aspect of the present invention, the antennas $11_1 \sim 11_N$ are used for both transmission and reception and the apparatus has a third switch 72 that alternately connects an antenna selected by the first switch 12 to a transmitter circuit 71 and the front end 13. If this arrangement is adopted, the antennas can be selected cyclically and used alternately for transmission/reception in the following manner: (1) transmission/reception is performed by the first antenna $11_1$, (2) then by the second antenna $11_2$, (3) then by the third through Nth antennas $11_3 \sim 11_N$ in succession, and (4) then again by the first antenna $11_1$ and so on. In accordance with this radar apparatus, therefore, it suffices to provide only the single front end 13 commonly for the antennas $11_1 \sim 11_N$ and, moreover, each antenna can be used for both transmission and reception.

Figure 19:
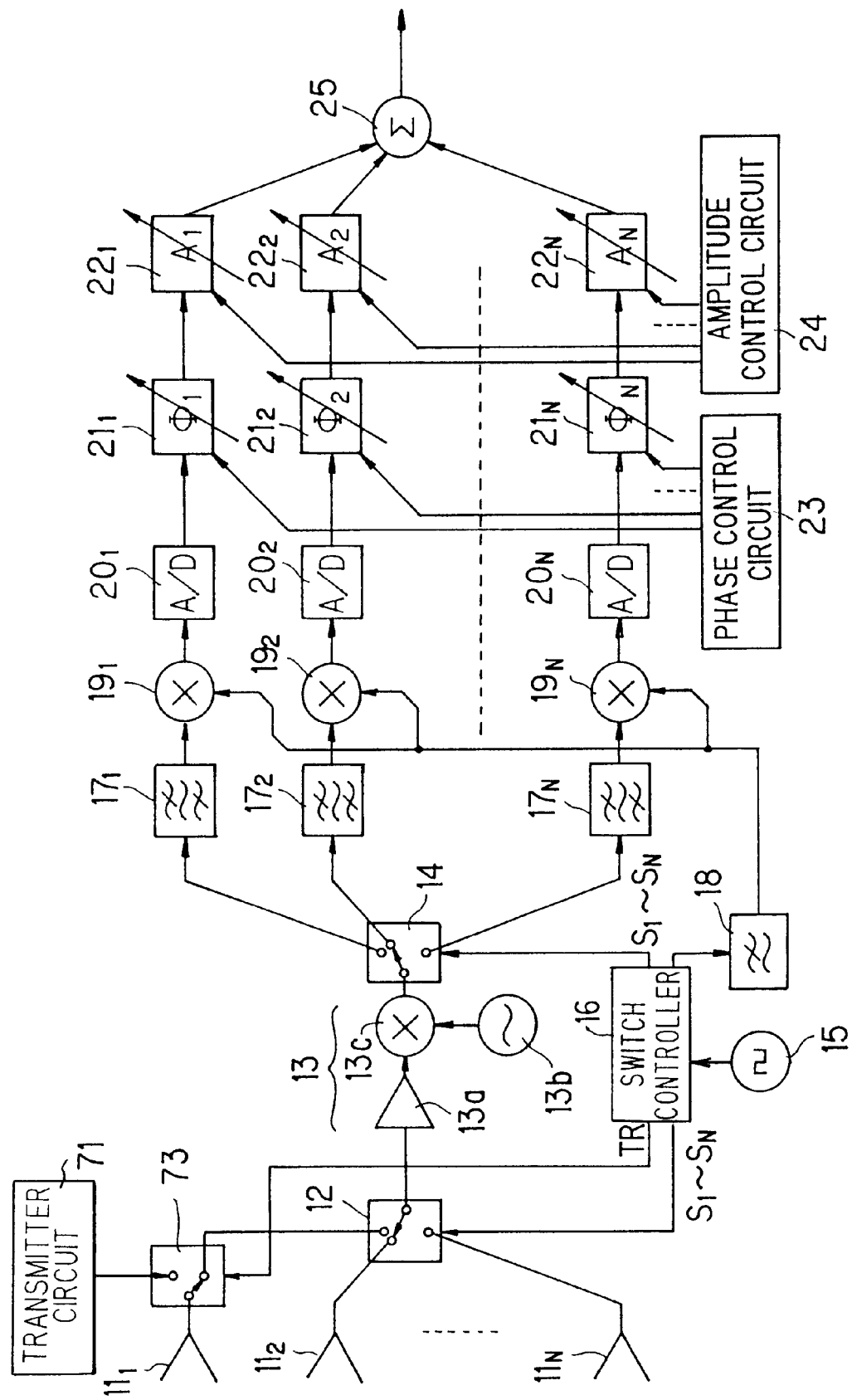
FIG. 19 is a diagram showing the construction of a radar apparatus according to a fifth embodiment for a case where one antenna is used for both transmission and reception.

(e) Overview of fifth aspect (see FIG. 19)

In the radar apparatus according to this aspect of the present invention, only the first antenna $11_1$ is used for both transmission and reception and the other antennas $11_2 \sim 11_N$ are used exclusively for reception, and the apparatus has a third switch 73 that connects the transmitter circuit 71 to the sending/receiving first antenna $11_1$ in alternation with the cyclic connecting of each antenna to the front end 13 by the first switch 12. If this arrangement is adopted, only the first antenna $11_1$ is used for both transmission and reception and the other antennas can be used exclusively for reception in the following manner: (1) transmission and reception are performed by the first antenna $11_1 \rightarrow$ (2) transmission is performed by the first antenna $11_1$ and reception by the second antenna $11_2 \rightarrow$ (3) transmission is performed by the first antenna $11_1$ and reception by the Nth antenna $11_N \rightarrow$ (4) transmission and reception are performed by the first antenna $11_1$ and so on. Only one front end need be provided for the antennas.

Figure 21:
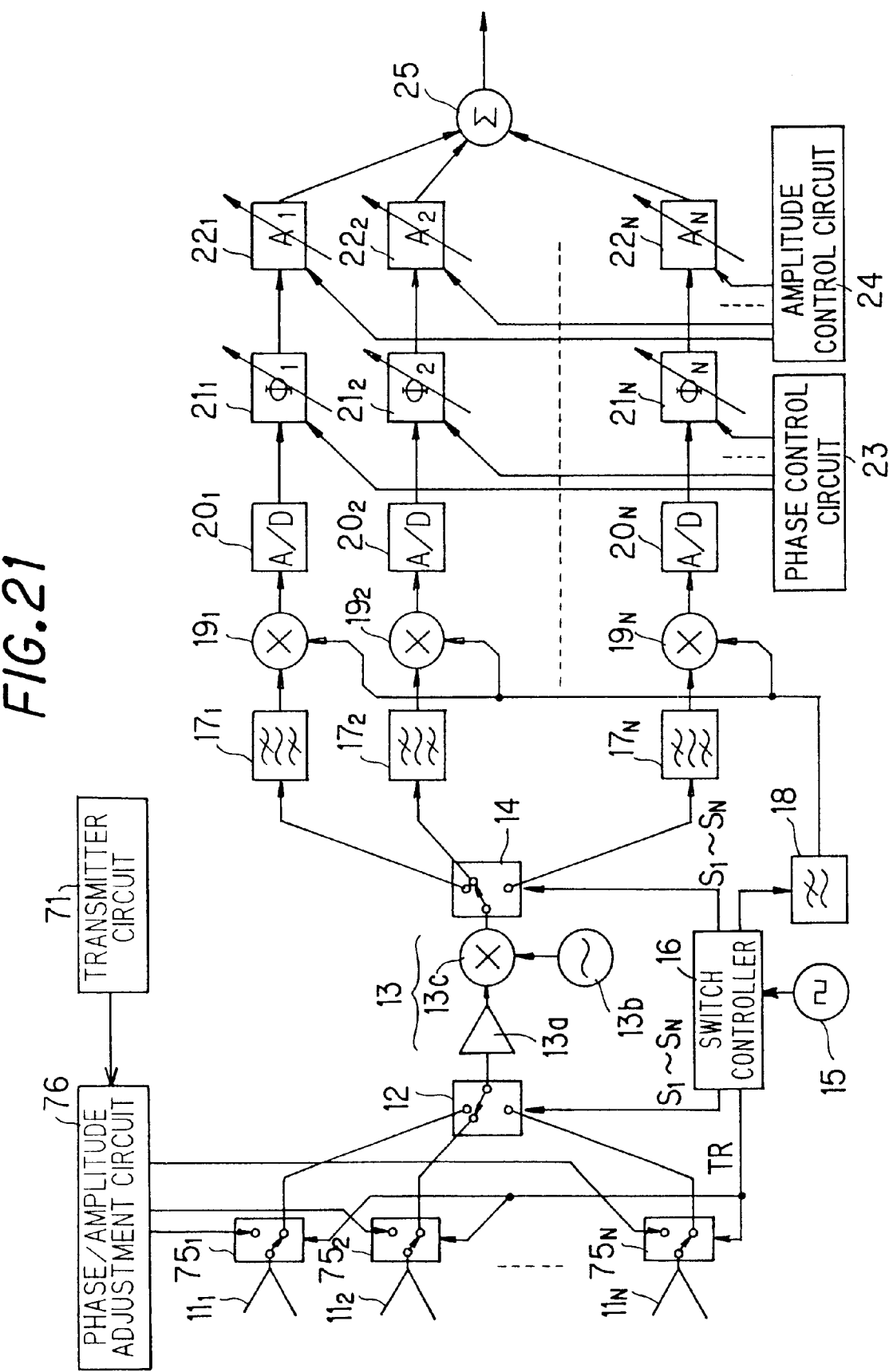
FIG. 21 is a diagram showing the construction of a radar apparatus according to a sixth embodiment for a case where all antennas are used for both transmission and reception.

(f) Overview of sixth aspect (see FIG. 21)

In the radar apparatus according to this aspect of the present invention, the antennas $11_1 \sim 11_N$ are used for both transmission and reception and the apparatus has third switches $75_1 \sim 75_N$ provided between the respective antennas and the first switch 12 for selectively connecting the antennas to the first switch 12 and transmitter circuit 71. In alternation with reception by cyclically connecting the antennas $11_1 \sim 11_N$ to the front end 13 by the first switch 12 and third switches $75_1 \sim 75_N$, transmission signals that have been adjusted in phase or amplitude are input to the respective antennas $11_1 \sim 11_N$ simultaneously and a desired antenna radiation pattern is formed at the time of transmission.

If this arrangement is adopted, only one front end need be provided for the antennas, each antenna can be used for both transmission and reception and a desired antenna radiation pattern is formed at the time of transmission.

Figure 10:
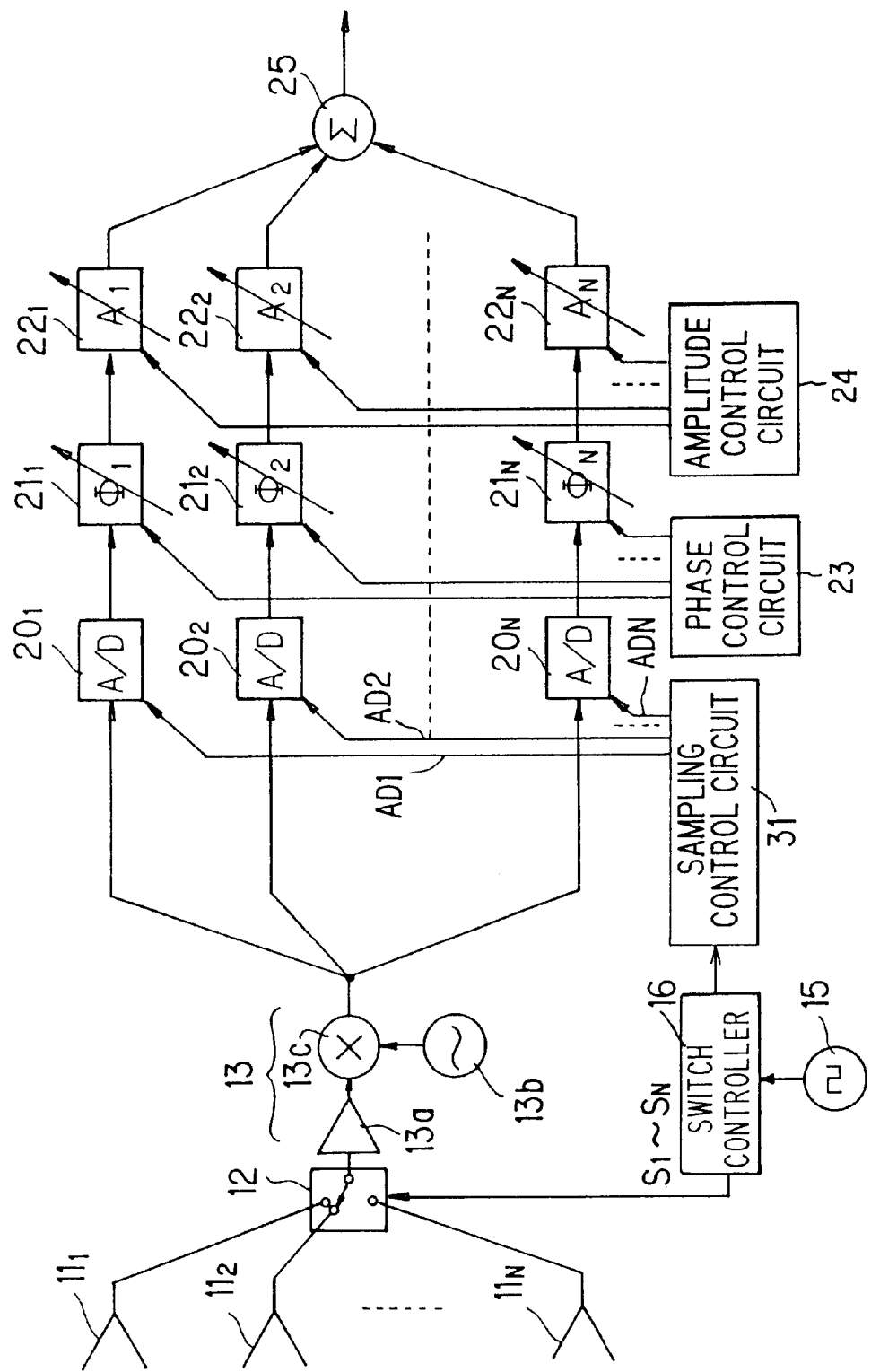
FIG. 10 is a diagram showing the construction of a radar apparatus according to a second embodiment of the present invention.

(g) Overview of seventh aspect (see FIG. 10)

The present invention according to this aspect provides an array antenna radar apparatus having the plurality of antennas $11_1 \sim 11_N$, the adjusting circuits $21_1 \sim 21_N$, $22_1 \sim 22_N$ provided in correspondence with respective ones of the antennas $11_1 \sim 11_N$ for adjusting phase or amplitude of input signals applied thereto, and the combining circuit 25 for combining signals that have been adjusted in phase or amplitude by the adjusting circuits. The radar apparatus further includes (1) a front end 13 provided commonly for the antennas $11_1 \sim 11_N$ for amplifying signals, which have been received by the antennas, successively applied thereto, and for frequency-converting the amplified signals to intermediate-frequency signals, (2) the switch 12 for cyclically connecting the antennas $11_1 \sim 11_N$ to the front end 13 at a prescribed switching frequency, (3) A/D converters $20_1 \sim 20_N$ provided in correspondence with respective ones of the antennas $11_1 \sim 11_N$ for A/D-converting signals output by the front end, and (4) a sampling control circuit 31 for causing an A/D converter that corresponds to an ith antenna to sample and A/D-convert an output signal of the front end when the signal received by the ith antenna is entering the front end, wherein a target lying in a desired direction is detected by adjusting the phase or amplitude of an output signal from each A/D converter and combining the signals that result.

If this arrangement is adopted, the outputs of the A/D converters become equal to what would be obtained by sampling the outputs of the frequency converters $19_1 \sim 19_N$ of FIG. 1. This makes it possible to eliminate the second switch and frequency converters of the radar apparatus shown in FIG. 1, thereby reducing the number of component parts.

Figure 12:
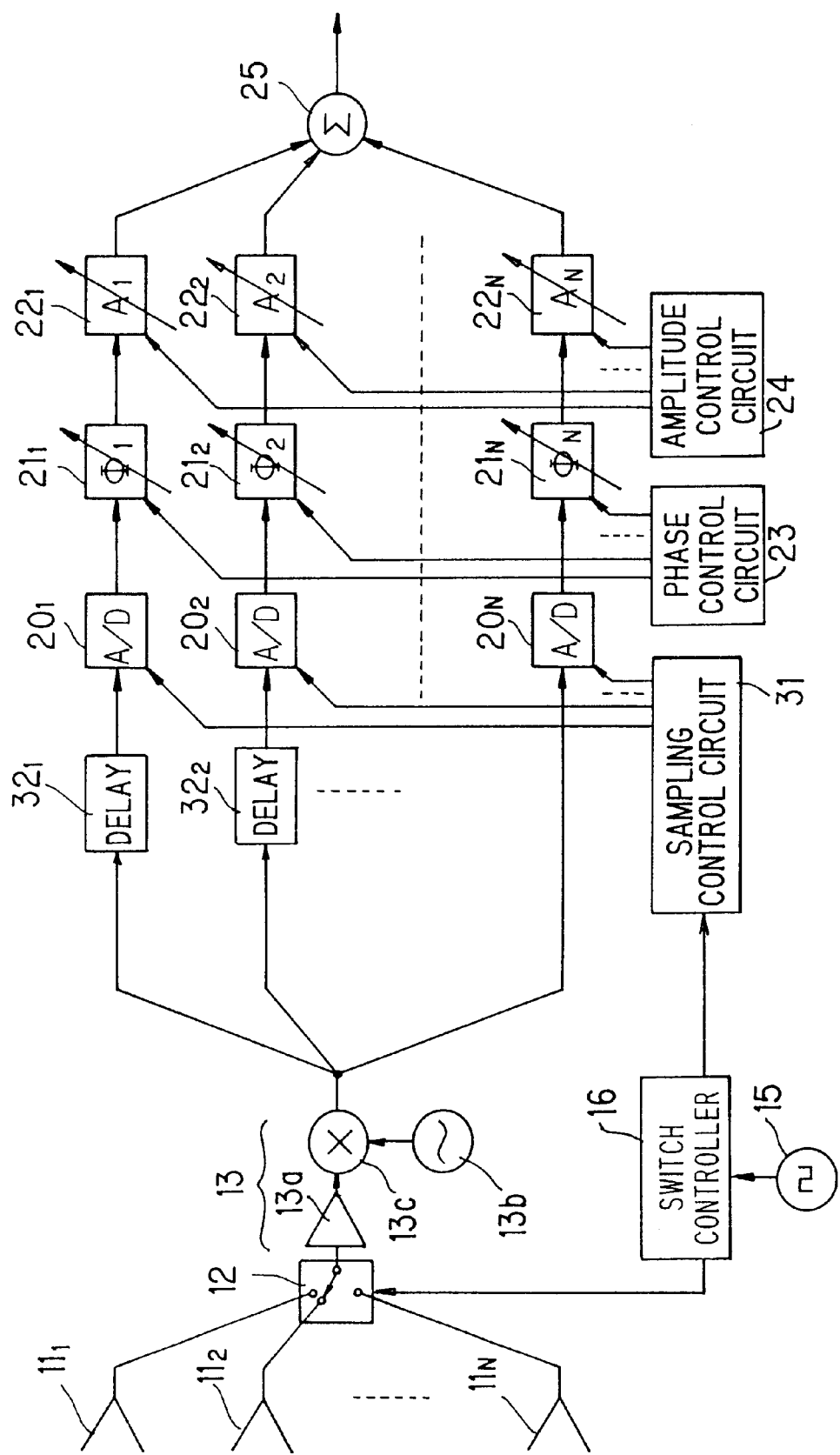
FIG. 12 is a diagram showing a radar apparatus according to a first modification of the second embodiment.

(h) Overview of eighth aspect (see FIG. 12)

The radar apparatus according to this aspect of the present invention has delay circuits $32_1 \sim 32_N$ provided at the inputs to the A/D converters $20_1 \sim 20_N$ for delaying the A/D conversion timing. By providing the delay circuits, received signals sampled at identical timings can be converted to digital data and processed. This makes it possible to improve the accuracy of target detection.

Figure 13:
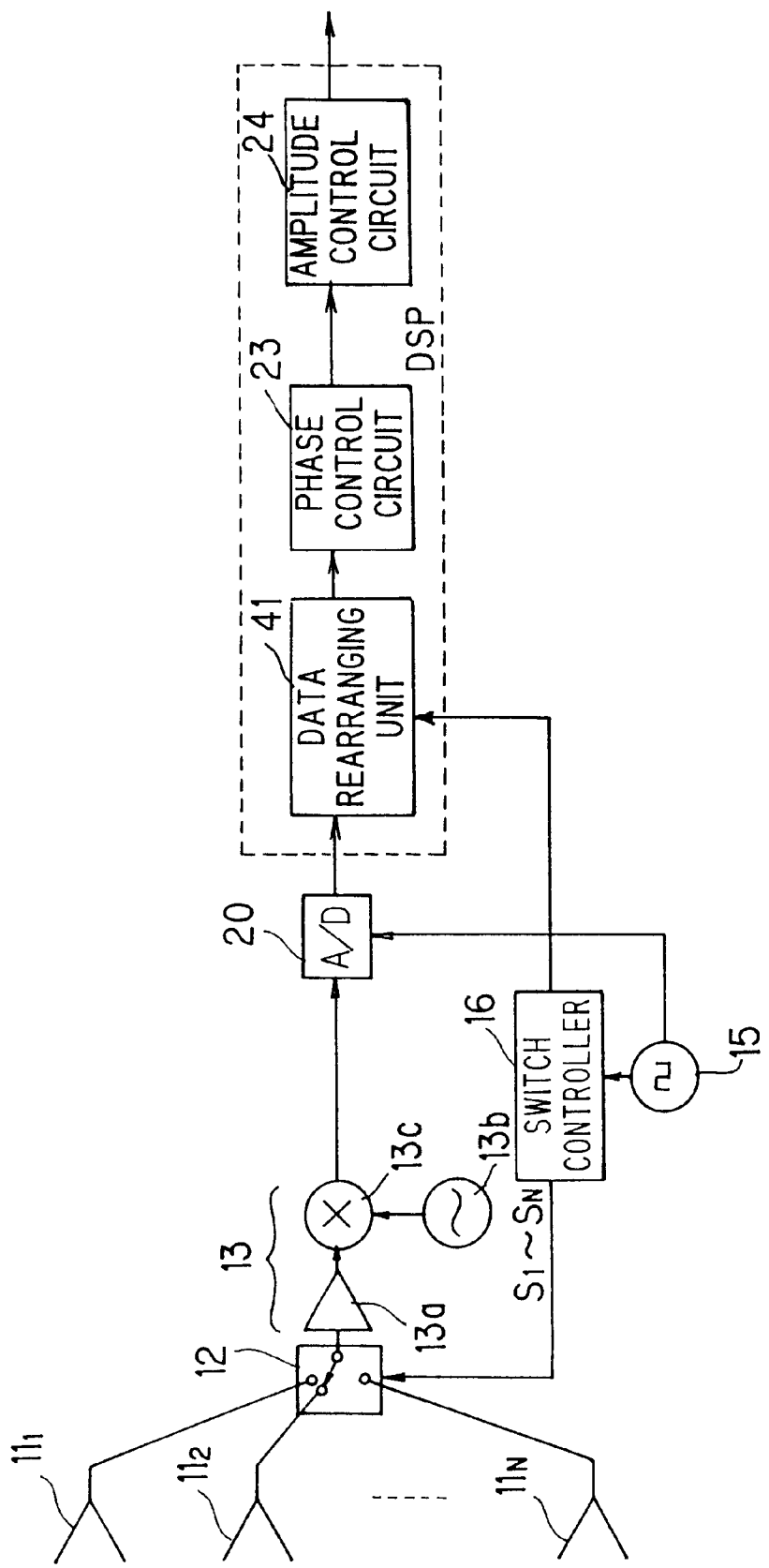
FIG. 13 is a diagram showing a radar apparatus according to a second modification of the second embodiment.

(i) Overview of ninth aspect (see FIG. 13)

The radar apparatus according to this aspect of the present invention has the plurality of antennas $11_1 \sim 11_N$, adjusting circuits 23, 24 provided for commonly for the antennas $11_1 \sim 11_N$ for adjusting phase or amplitude of input signals applied thereto, and a combining circuit for combining signals that have been adjusted in phase or amplitude by the adjusting circuits. This array antenna radar apparatus includes (1) a front end 13 provided commonly for the antennas $11_1 \sim 11_N$ for amplifying signals, which have been received by the antennas, successively applied thereto, and for frequency-converting the amplified signals to intermediate-frequency signals, (2) the switch 12 for cyclically connecting the antennas $11_1 \sim 11_N$ to the front end 13 at a prescribed switching frequency, (3) an A/D converters 20 for A/D-converting the intermediate-frequency signal output by the front end 13, and (4) means 15~16, 41 for causing the A/D converter 20 to sample and A/D convert the output of the front end 13 at a frequency obtained by multiplying the switching frequency by the number of the plurality of antennas, and for storing, as a signal corresponding to an ith antenna, an A/D converted output prevailing when the signal received by the ith antenna is entering the front end, wherein a target lying in a desired direction is detected by adjusting the phase or amplitude of an output signal, which corresponds to each antenna, from the A/D converter 20, and combining the signals that result.

If this arrangement is adopted, only one A/D converter and one phase/amplitude adjusting means need be provided commonly for the antennas. This makes it possible to reduce the number of component parts even further and to further simply the arrangement.

Figure 15:
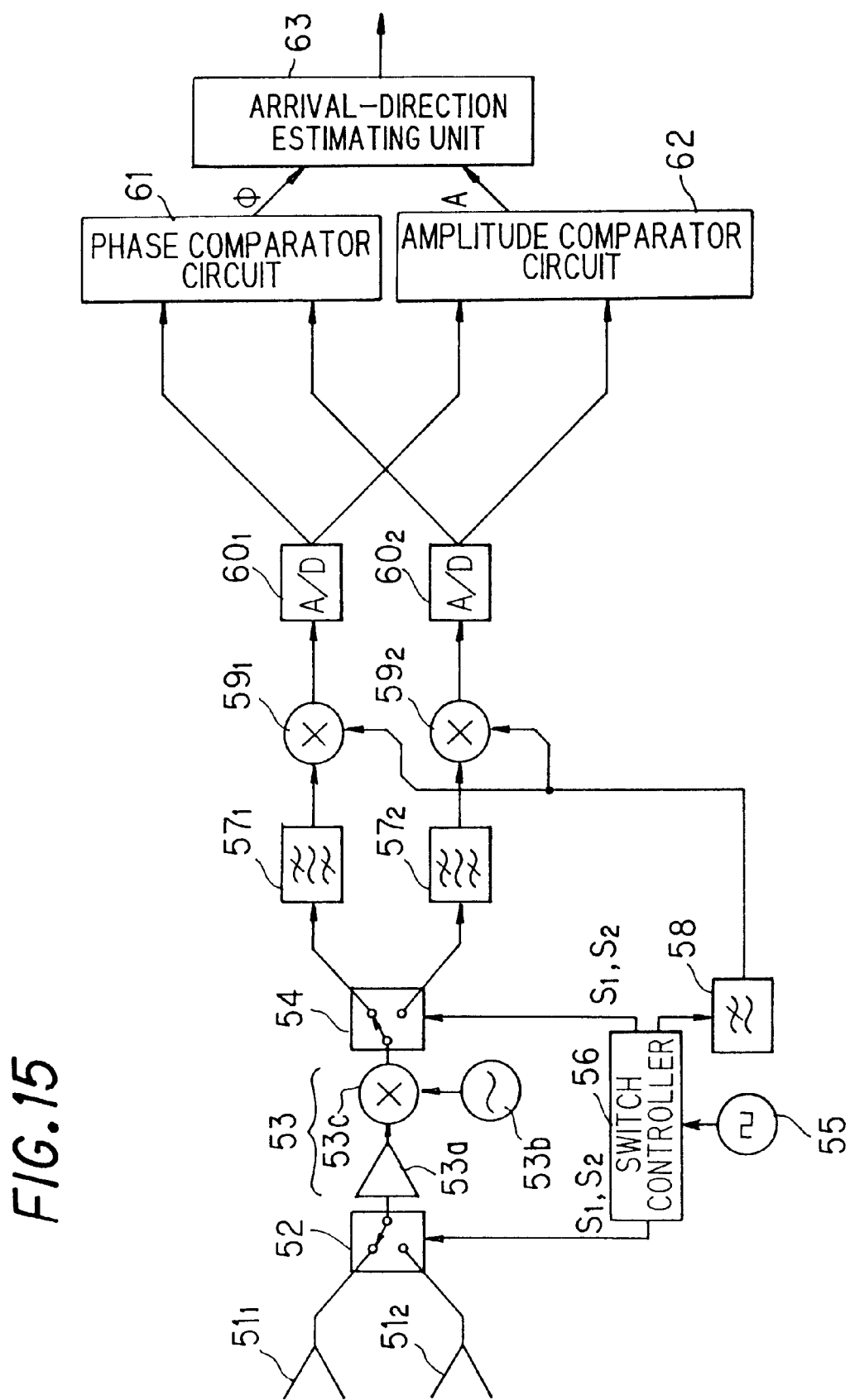
FIG. 15 is a diagram showing the construction of a monopulse radar apparatus according to a third embodiment of the present invention.

(j) Overview of tenth aspect (see FIG. 15)

This aspect of the present invention provides a monopulse radar apparatus having two antennas $51_1$, $51_2$, comparators 61, 62 for comparing the phases or amplitudes of reflected signals that arrive at the two antennas, and an arrival-direction estimating unit 63 for estimating the arrival direction of a reflected signal based upon the results of the comparison. The radar apparatus further includes (1) a front end 53 provided commonly for the antennas $51_1$, $51_2$ for amplifying signals, which have been received by the antennas, successively applied thereto, and for frequency-converting the amplified signals to intermediate-frequency signals, (2) a first switch 52 for alternately connecting the antennas $51_1$, $51_2$ to the front end 53 at a prescribed switching frequency, (3) frequency converters $59_1$, $59_2$ provided in correspondence with respective ones of the antennas $51_1$, $51_2$ for frequency-converting the intermediate-frequency signals output by the front end 13 to other intermediate-frequency signals or baseband signals at the above-mentioned switching frequency, (4) a second switch 54, which is switched in synchronization with the first switch 52, for connecting an output of the front end 53 to a frequency converter that corresponds to an ith antenna when the signal received by the ith antenna is entering the front end 53, (5) intermediate-frequency filters $57_1$, $57_2$ provided between the second switch 54 and respective ones of the frequency converters $59_1$, $59_2$, wherein output signals of the frequency converters are adopted as the reflected signals and the phases or amplitudes thereof are compared to estimate the arrival direction of a reflected signal.

If this arrangement is adopted, only the single front end 53 need be provided commonly for the antennas. This makes it possible to simplify the arrangement and to dispense with compensating means and adjustment circuits required in the prior art.

Figure 23:
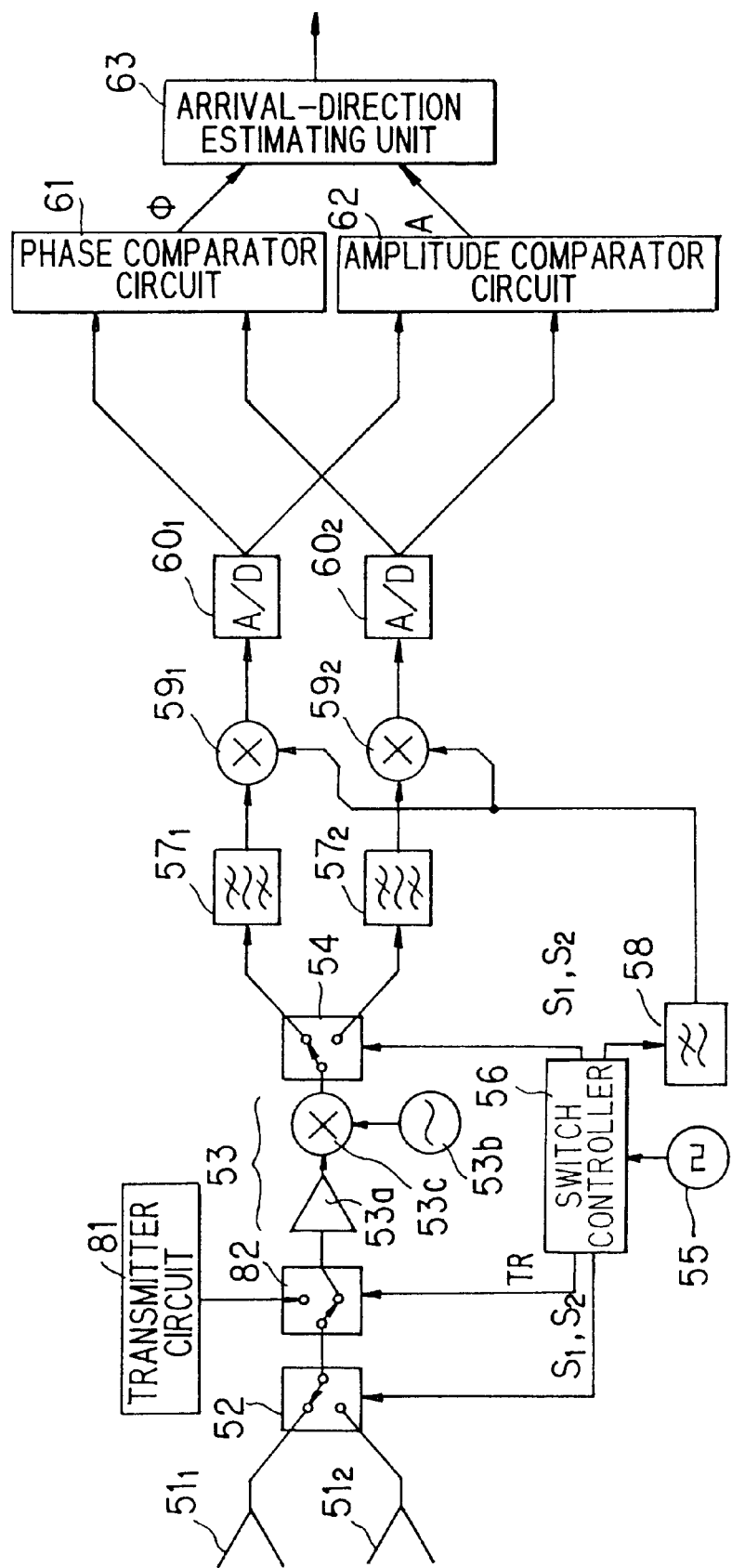
FIG. 23 is a diagram showing the construction of a monopulse radar apparatus according to a seventh embodiment of the present invention.
Figure 24:
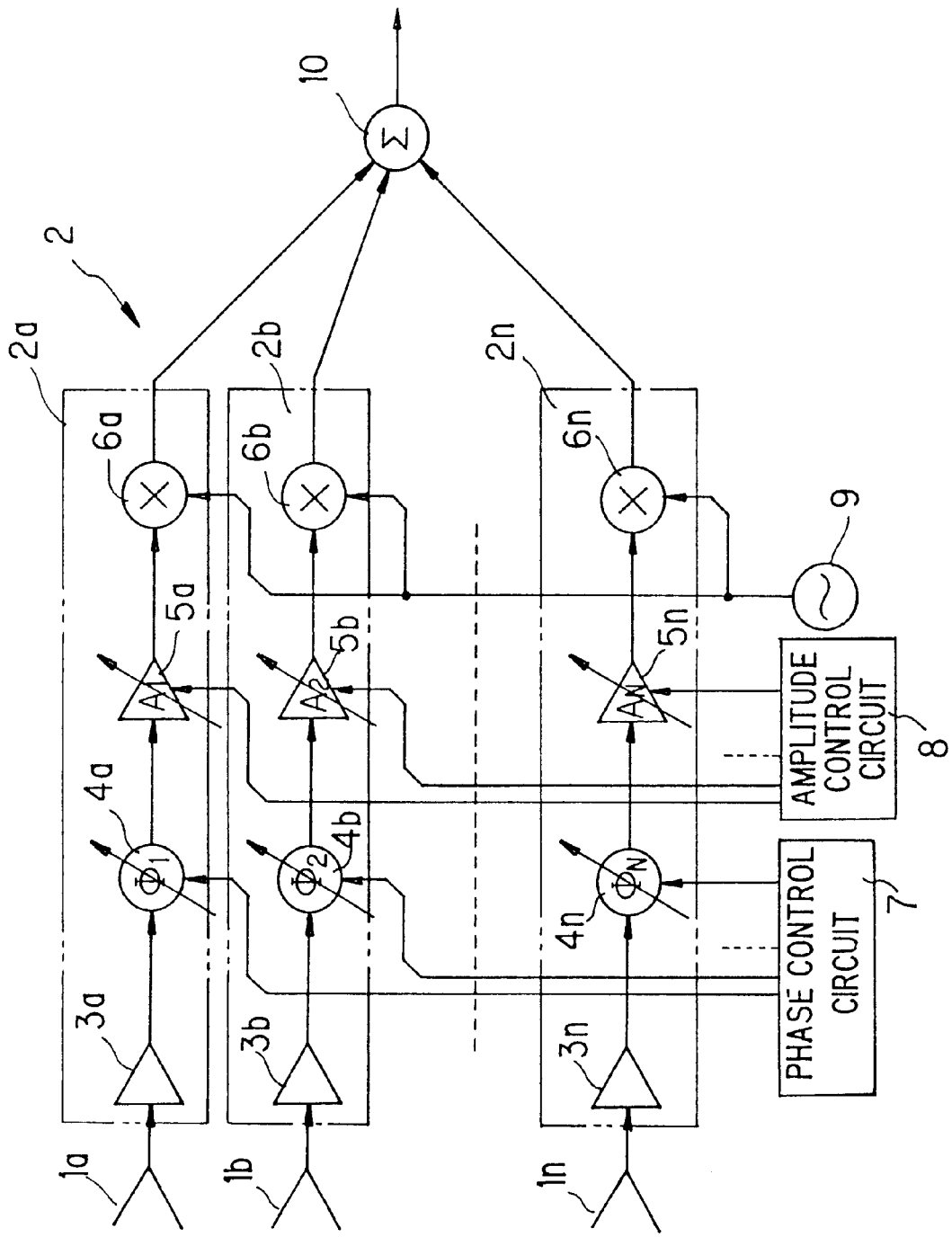
FIG. 24 is a diagram showing the construction of the receiver section of a radar apparatus having active array antennas.
Figure 25:
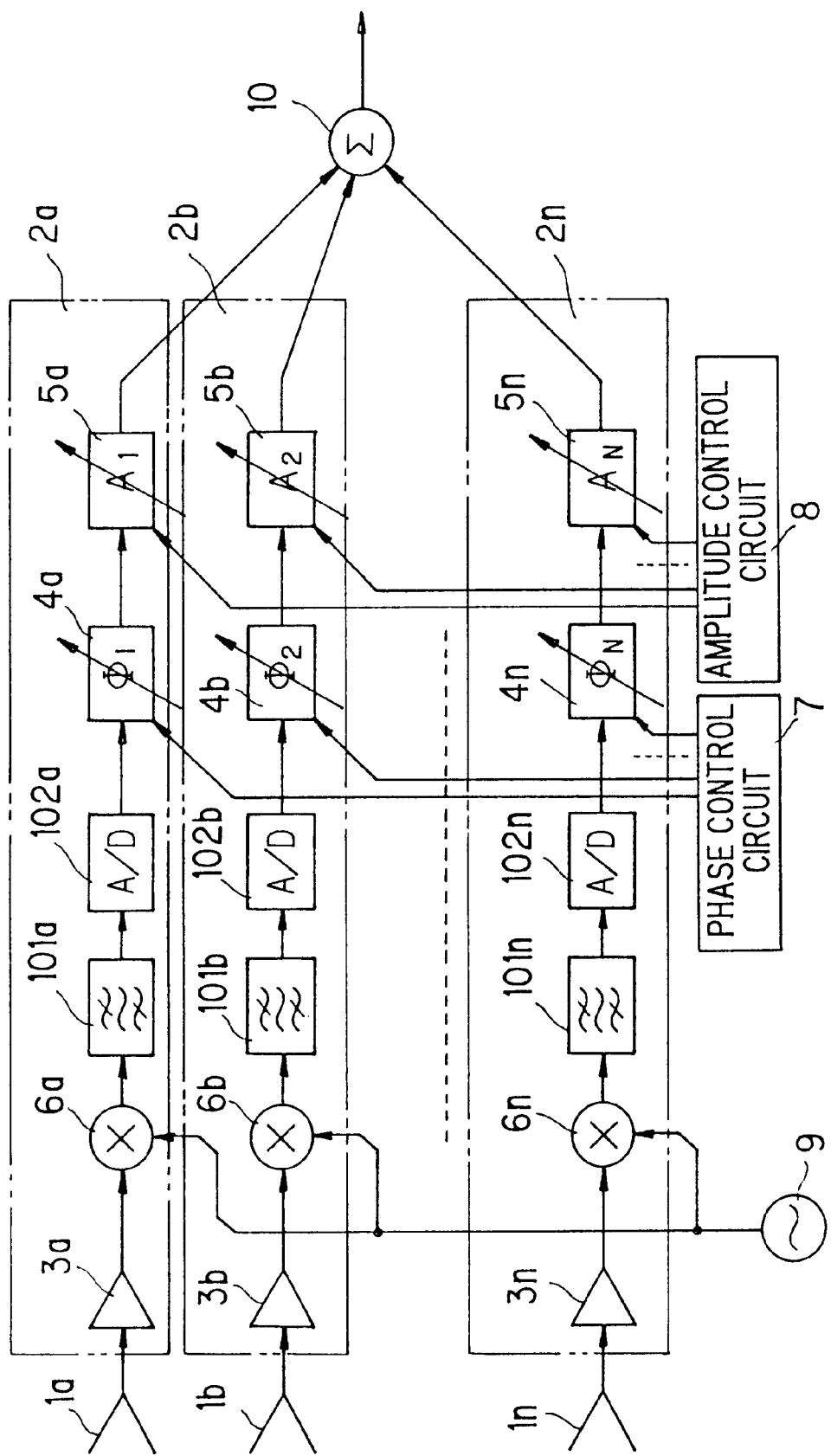
FIG. 25 is a diagram showing the construction of the receiver section of a DBFN (beam-scan) radar apparatus.
Figure 26:
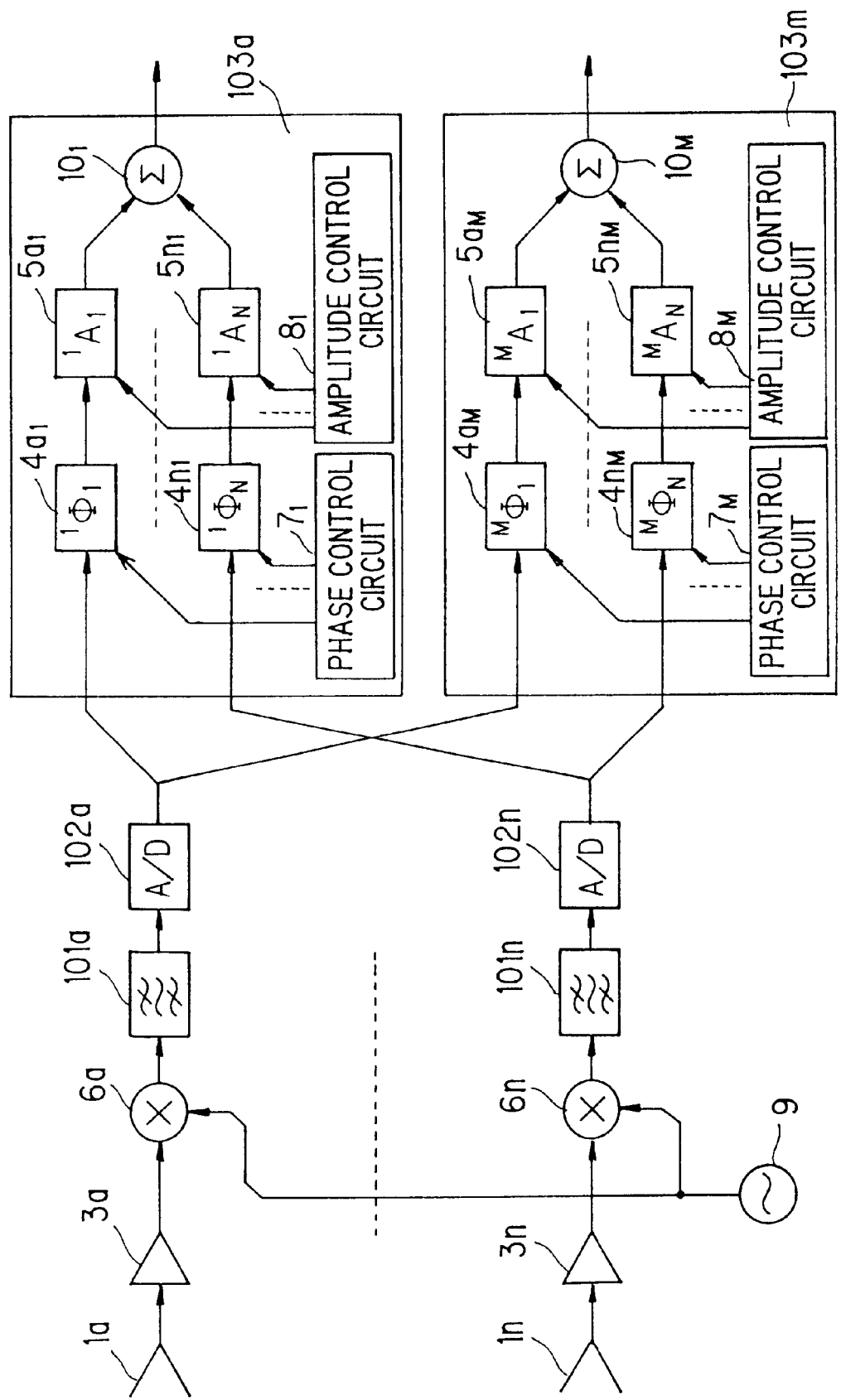
FIG. 26 is a diagram showing the construction of the receiver section of a DBFN (multiple-beam) radar apparatus.

(k) Overview of 11th aspect (see FIG. 23)

In the radar apparatus according to this aspect of the present invention, the two antennas $51_1$, $51_2$ are used for both transmission and reception and the apparatus has a third switch 82 that alternately connects an antenna selected by the first switch 52 to a transmitter circuit 81 and the front end 53. If this arrangement is adopted, the first and second antennas can be selected alternately and used for transmission and reception in the following manner: (1) transmission/reception is performed by the first antenna $51_1$, (2) then by the second antenna $51_2$, and (3) then again by the first antenna $51_1$ and so on. In accordance with this radar apparatus, therefore, it suffices to provide only the single front end 53 commonly for the two antennas $51_1$, $51_2$ and, moreover, each antenna can be used for both transmission and reception.

Figure 16:
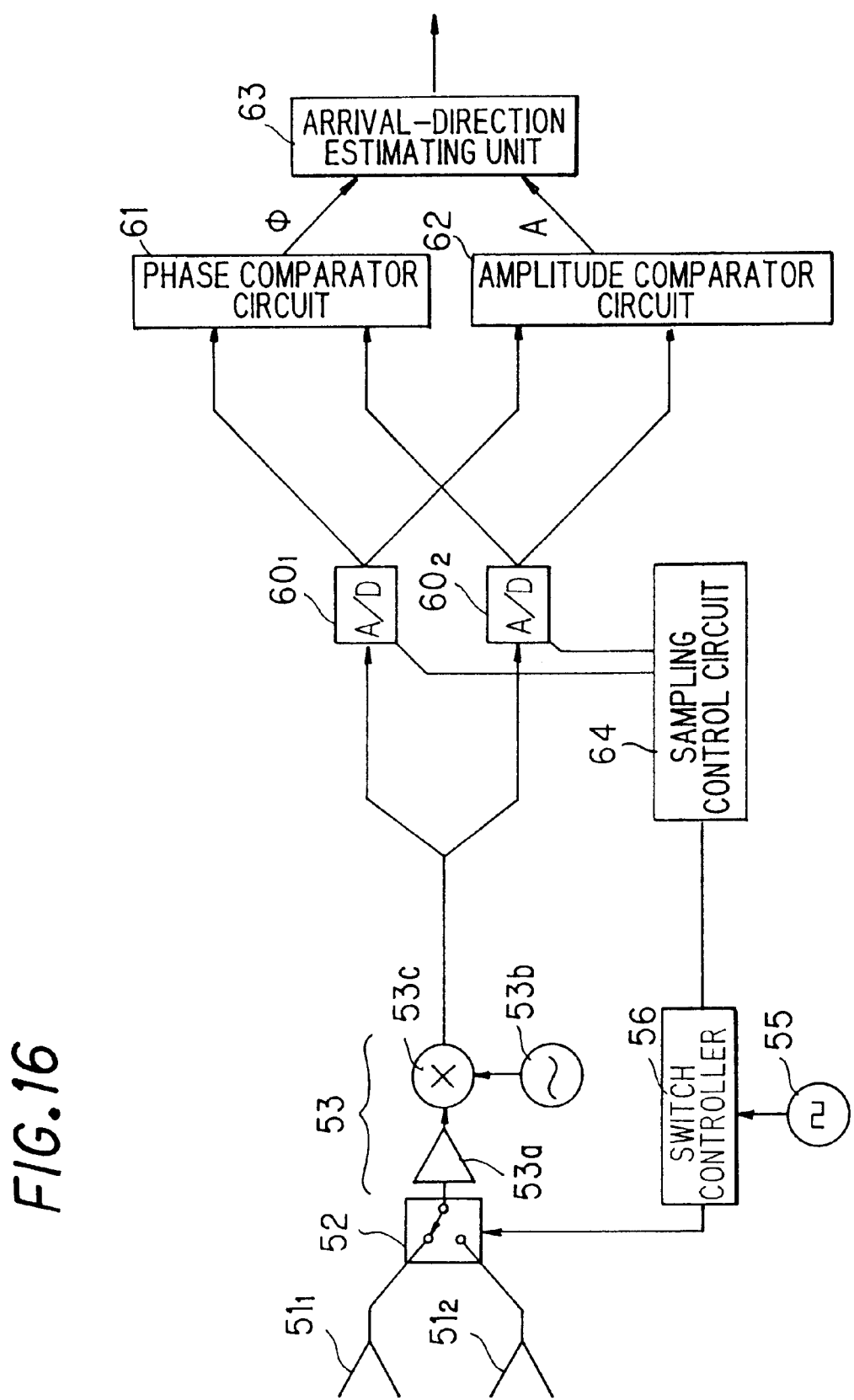
FIG. 16 is a diagram showing a radar apparatus which is a modification of the third embodiment.

(l) Overview of 12th aspect (see FIG. 16)

This aspect of the present invention provides a monopulse radar apparatus having the two antennas $51_1$, $51_2$, the comparators 61, 62 for comparing the phases or amplitudes of reflected signals that arrive at the two antennas, and the arrival-direction estimating unit 63 for estimating the arrival direction of a reflected signal based upon the results of the comparison. The radar apparatus further includes (1) the front end 53 provided commonly for the antennas $51_1$, $51_2$ for amplifying signals, which have been received by the antennas, successively applied thereto, and for frequency-converting the amplified signals to intermediate-frequency signals, (2) the switch 52 for alternately connecting the antennas $51_1$, $51_2$ to the front end 53 at a prescribed switching frequency, (3) A/D converters $60_1$, $60_2$ provided in correspondence with respective ones of the antennas $51_1$, $51_2$ for A/D-converting intermediate-frequency signals output by the front end, and (4) a sampling control circuit 64 for causing an A/D converter that corresponds to an ith antenna to sample and A/D-convert an output signal of the front end when the signal received by the ith antenna is entering the front end, wherein output signals of the A/D converters are adopted as the reflected signals and the phases or amplitudes thereof are compared to estimate the arrival direction of a reflected signal.

If this arrangement is adopted, the outputs of the A/D converters become equal to what would be obtained by sampling the outputs of the frequency converters of FIG. 15. This makes it possible to eliminate the second switch and frequency converters, thereby reducing the number of component parts.

(B) First Embodiment
(a) Configuration

FIG. 1 is a diagram showing the construction of a radar apparatus according to a first embodiment of the present invention. FIG. 1 illustrates primarily the receiving section, which is of DBFN type.

The apparatus includes the plurality of antennas $11_1 \sim 11_N$, which receive reflected electric power from a target, and the first switch 12. The latter cyclically selects, and connects to the front end 13, the antennas $11_1 \sim 11_N$ at a frequency fs that is much higher than a baseband frequency fb, as shown in FIG. 2. The front end 13 is provided commonly for each of the antennas $11_1 \sim 11_N$ and has (1) an RF amplifier 13a for low-noise amplification of the signal received by each antenna, (2) a local oscillator 13b for outputting a local oscillation signal of frequency $f_{LO}$ (=fc−fb), where fc represents a carrier frequency and fb the baseband frequency, and (3) a mixer (frequency converter) 13c for mixing the local oscillation signal of frequency $f_{LO}$ (=fc−fb) with the RF signal output by the RF amplifier 13a and frequency-converting the RF signal to an intermediate-frequency signal.

The second switch 14, which is switched in synchronization with the first switch 12, connects the output of the front end 13 to the frequency converter that corresponds to the ith antenna when the signal received by the ith antenna is entering the front end 13. The oscillator 15 outputs a signal having a frequency of N·fs. A switch controller 16 receives the signal of frequency N·fs as an input and outputs antenna selection signals $S_1 \sim S_N$, which are shown in FIG. 2, to control the first and second switches 12, 14.

The IF filters $17_1 \sim 17_N$, which are provided for respective ones of the antennas $11_1 \sim 11_N$, remove higher harmonics and low-frequency components from the signal that enters from the front end 13 and pass the desired intermediate-frequency components. A low-pass filter 18 converts a rectangular wave having the frequency of fs to a sinusoidal local oscillation signal and outputs this signal to the mixers (frequency converters) $19_1 \sim 19_N$. The latter mix the local oscillation signal with IF signals from the corresponding IF filters $17_1 \sim 17_N$ to effect a frequency conversion to other intermediate-frequency signals or baseband signals.

The A/D converters $20_1 \sim 20_N$ convert the outputs of the corresponding frequency converters to digital data. Phase shifters $21_1 \sim 21_N$ apply phase shifts of predetermined amounts $\phi_1 \sim \phi_N$ to inputs applied to them. Amplitude adjusters $22_1 \sim 22_N$ adjust the amplitudes of the signals output by the corresponding phase shifters. A phase control circuit 23 and an amplitude control circuit 24 decide phase shifts of amounts $\phi_1 \sim \phi_N$ and amplitude adjustment values $A_1 \sim A_N$ so as to perform a phase adjustment and amplitude adjustment conforming to the desired beam pattern, and input $\phi_1 \sim \phi_N$ and $A_1 \sim A_N$ to the respective phase shifters $21_1 \sim 21_N$ and respective amplitude adjusters $22_1 \sim 22_N$. An adder 25 combines the output signals from the amplitude adjusters $22_1 \sim 22_N$ and outputs the resulting signal.

(b) Operation

The RF signals received by the antennas $11_1 \sim 11_N$ are cyclically selected and input to the front end 13 by the first switch 12 at the frequency fs, and the output of the front end 13 is selected by the second switch 14, which performs a switching operation in synchronization with the first switch 12. More specifically, the second switch 14 performs a switching operation in sync with the first switch 12 so that when a signal received by an ith antenna $11_i$ is entering the front end 13, the output of the front end 13 is connected to the frequency converter $19_i$ that corresponds to the ith antenna.

Figure 3A:
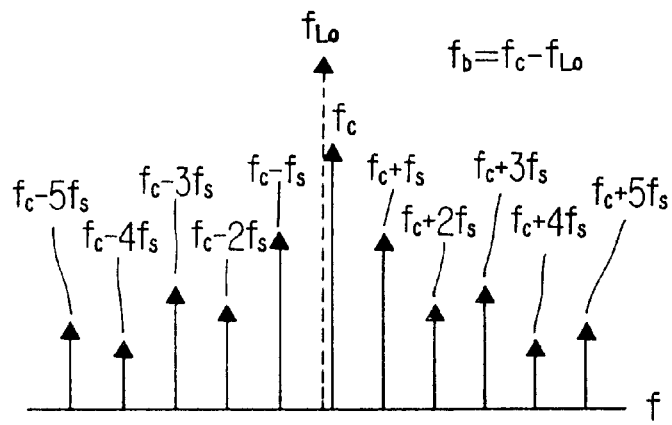
FIGS. 3A–3C are spectrum diagrams useful in describing the operations of various components.
Figure 3B:
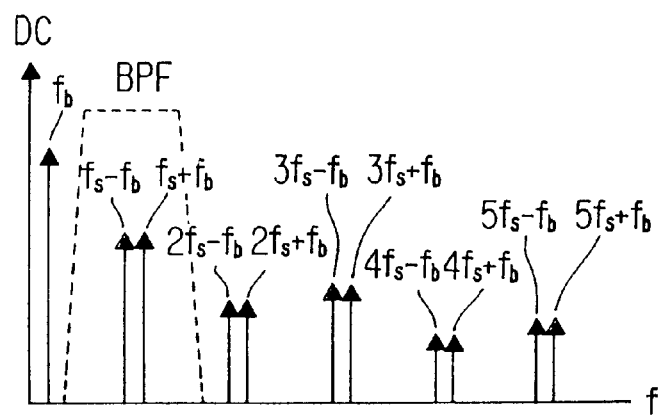

Intermittently selecting, at the frequency fs, the RF signals (carrier signals) received by the antennas $11_1 \sim 11_N$ is equivalent to modulating the amplitude of the RF signal (carrier signal) at the frequency fs. Accordingly, frequency components indicated by the spectrum of FIG. 3A are generated by the switching operation of the first and second switches 12, 14, where fc represents the frequency of the carrier signal (RF signal), fb the frequency of the baseband signal carried by the carrier signal, $f_{LO}$ (=fc−fb) the oscillation frequency of the local oscillation signal and fs the switching frequency. If the local oscillation signal of frequency $f_{LO}$ (=fc−fb) is mixed with this signal by the mixer 13c, a signal having the spectrum distribution shown in FIG. 3B is generated. This signal is input to the IF filters $17_1 \sim 17_N$.

Figure 3C:
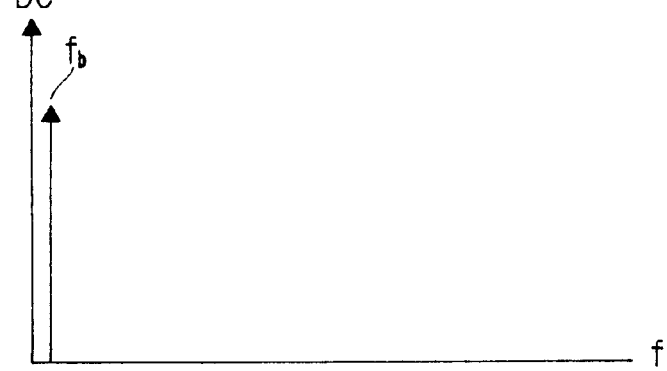

The IF filters $17_1 \sim 17_N$ each select and output an IF signal (a signal having an intermediate frequency of fs±fb) contained in the intermediate-frequency band indicated by the dashed line in FIG. 3B. The frequency converters $19_1 \sim 19_N$ mix the local oscillation signal of frequency fs output by the filter 18 with the signals that enter from the IF filters $17_1 \sim 17_N$, respectively, demodulate the baseband signal shown in FIG. 3C and output the resulting signal.

The A/D converters $20_1 \sim 20_N$ convert the baseband signals demodulated by the frequency converters $19_1 \sim 19_N$ to digital data. The phase control circuit 23 and amplitude control circuit 24 decide the phase shifts of amounts $\phi_1 \sim \phi_N$ and the amplitude adjustment values $A_1 \sim A_N$ so as to perform a phase adjustment and amplitude adjustment conforming to the desired beam pattern, i.e., so as to detect a target in a desired direction, and set $\phi_1 \sim \phi_N$ and $A_1 \sim A_N$ in the respective phase shifters $21_1 \sim 21_N$ and respective amplitude adjusters $22_1 \sim 22_N$.

The phase shifters $21_1 \sim 21_N$ and amplitude adjusters $22_1 \sim 22_N$ subject the digital data that has entered from the A/D converters $20_1 \sim 20_N$ to the phase shifts $\phi_1 \sim \phi_N$ and amplitude adjustment values $A_1 \sim A_N$, and the adder 25 combines the signals output by the amplitude adjusters $22_1 \sim 22_N$ and inputs the result to a processing unit (not shown), which is the next stage. The processing unit executes target detection processing. By thenceforth repeating the foregoing control while successively changing the search direction, the direction in which the target lies can be detected.

Thus, in accordance with the first embodiment, only the one front end 13 need be provided commonly for the antennas in a radar apparatus composed of an array antenna. This makes it possible to simplify the apparatus and or dispense with the compensating means and adjustment circuits required in the prior art.

(c) First modification

Figure 4:
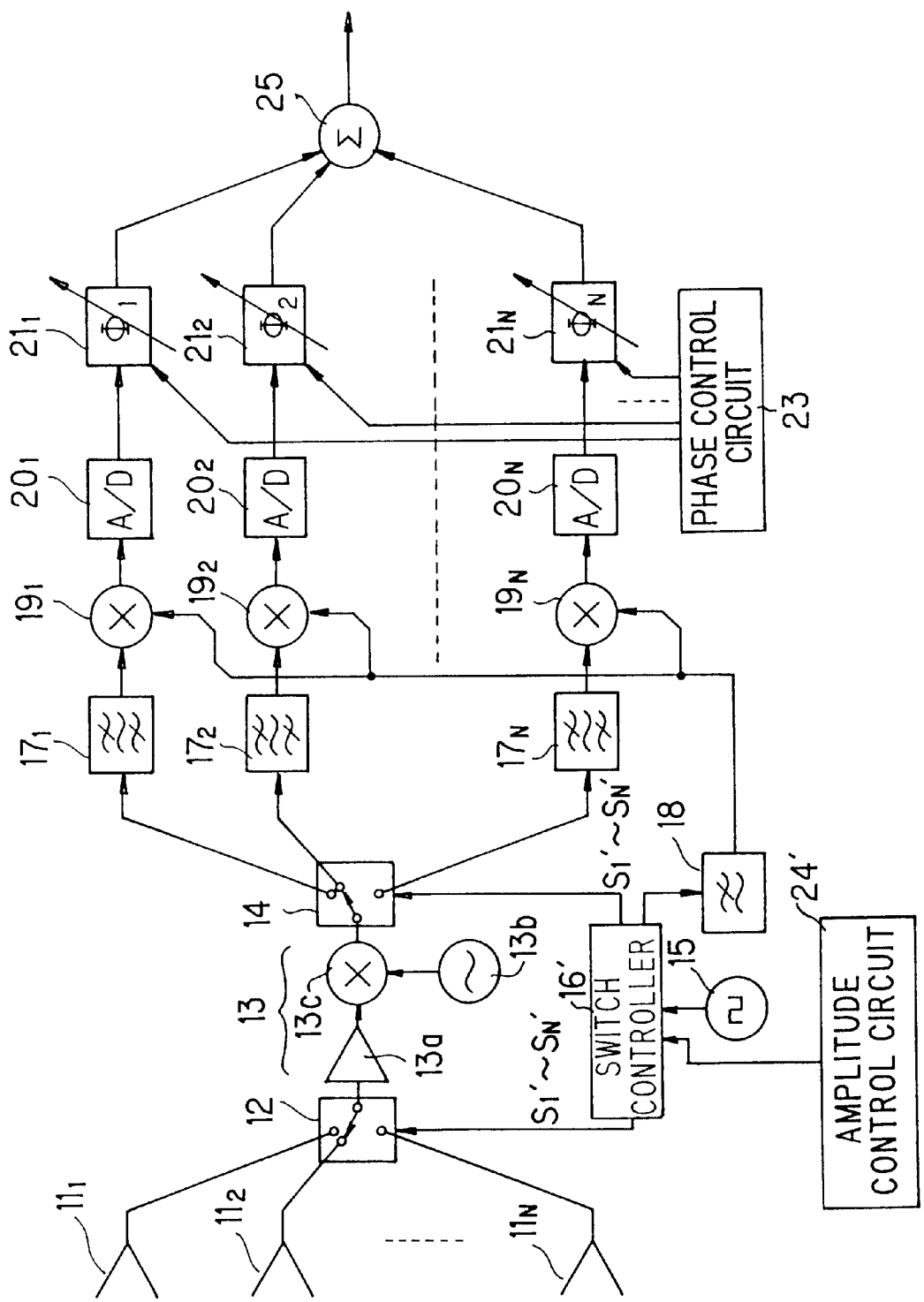
FIG. 4 is a diagram showing a first modification of amplitude control according to the first embodiment.

FIG. 4 is a diagram showing a modification of amplitude control according to the first embodiment. Components identical with those of the first embodiment shown in FIG. 1 are designated by like reference characters. In the first embodiment, amplitude is adjusted by causing the amplitude adjustment values $A_1 \sim A_N$ to act upon the digital data of the baseband. In the first modification of FIG. 4, however, amplitude is adjusted by adjusting the ON times of the first and second switches 12, 14.

Figure 5:
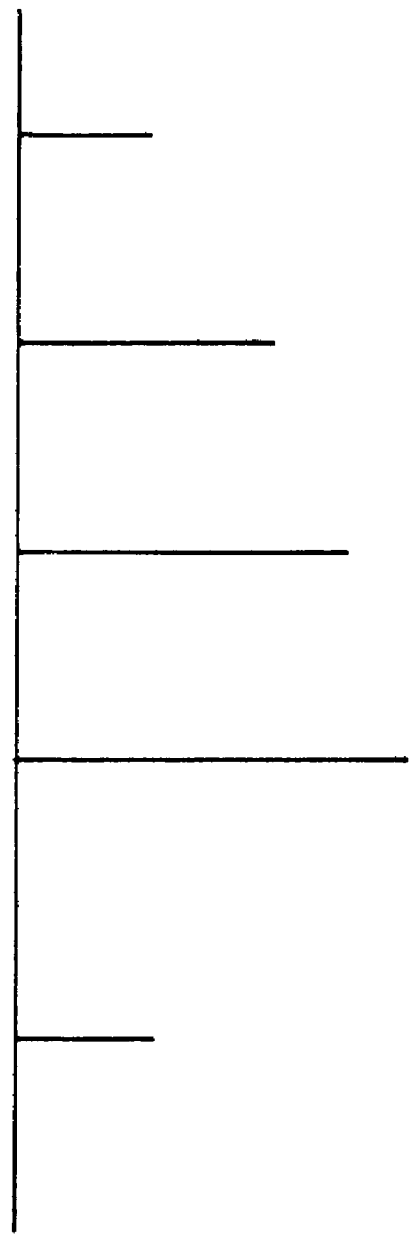
FIG. 5 is a diagram useful in describing amplitude weightings of corresponding antennas.

If amplitude weightings for the amplitude adjusters $22_1 \sim 22_N$ are entered as inputs, as shown in FIG. 5, an amplitude control circuit 24' converts these amplitude weighting values to switch ON times $W_1 \sim W_N$ and inputs the switch ON times to a switching controller 16'. As a result, the switch controller 16' generates antenna selection signals $S_1' \sim S_N'$ of respective pulse widths $W_1 \sim W_N$ at the frequency fs, as illustrated in FIG. 6. On the basis of the antenna selection signals $S_1' \sim S_N'$, the first and second switches 12, 14 control the time during which each antenna is selected and connected to the input side of the front end 13 and the time during which the output of the front end 13 is input to the frequency converters. Since pulse width and amplitude are equivalent, pulse width is adjusted in dependence upon the pulse widths $W_1 \sim W_N$. In other words, the amplitude control circuit 24' adjusts the lengths of time $W_1 \sim W_N$ during which the antennas $11_1 \sim 11_N$ are connected to the front end 13 and the output of the front end 13 is connected to the frequency converters $19_1 \sim 19_N$ that correspond to these antenna in such a manner that $W_1 \sim W_N$ will take on values conforming to the amplitude adjustment values $A_1 \sim A_N$.

In accordance with this modification, amplitude adjustment can be carried out merely by changing the ON times of the switches. This makes it possible to simplify the apparatus.

(d) Second modification

The phase and amplitude of the local oscillation signal are reflected in the outputs of the frequency converters $19_1 \sim 19_N$ of the first embodiment. In other words, by shifting the phase and adjusting the amplitude of the local oscillation signal, it is possible to obtain an effect identical with that obtained by shifting the phase and adjusting the amplitude of the intermediate-frequency signal or baseband signal. Accordingly, in the second modification, the phase-shift quantities and amplitude correction values of the local oscillation signal in the frequency converters $19_1 \sim 19_N$ are controlled to thereby obtain the desired beam pattern, i.e., to make possible detection of a target from a desired direction.

FIG. 7 is a diagram showing the construction of the second modification. Components identical with those of the first embodiment shown in FIG. 1 are designated by like reference characters. The local oscillation signal of the frequency converters $19_1 \sim 19_N$ is the output signal of the low-pass filter 18. Accordingly, in the second modification, the output side of the low-pass filter 18 is provided with the phase shifters $21_1 \sim 21_N$ and amplitude adjusters $22_1 \sim 22_N$ that control the phase and amplitude of the output of the low-pass filter 18. The input to the low-pass filter 18 is the rectangular wave of frequency fs from the switch controller 16.

The phase control circuit 23 and the amplitude control circuit 24 decide the phase shifts of amounts $\phi_1 \sim \phi_N$ and the amplitude adjustment values $A_1 \sim A_N$ so as to perform a phase adjustment and amplitude adjustment conforming to the desired beam pattern, and set $\phi_1 \sim \phi_N$ and $A_1 \sim A_N$ in the respective phase shifters $21_1 \sim 21_N$ and respective amplitude adjusters $22_1 \sim 22_N$. The phase shifters $21_1 \sim 21_N$ apply the phase shifts of predetermined amounts $\phi_1 \sim \phi_N$ to the local oscillation signal, and the amplitude adjusters $22_1 \sim 22_N$ apply the amplitude adjustment of amplitude adjustment values $A_1 \sim A_N$ to the signals output by the respective phase shifters. As a result, the phase shift quantities $\phi_1 \sim \phi_N$ and the amplitude adjustment values $A_1 \sim A_N$ are reflected in the outputs of the frequency converters $19_1 \sim 19_N$ and the target can be detected from the desired beam pattern, i.e., in the desired direction.

Figure 8:
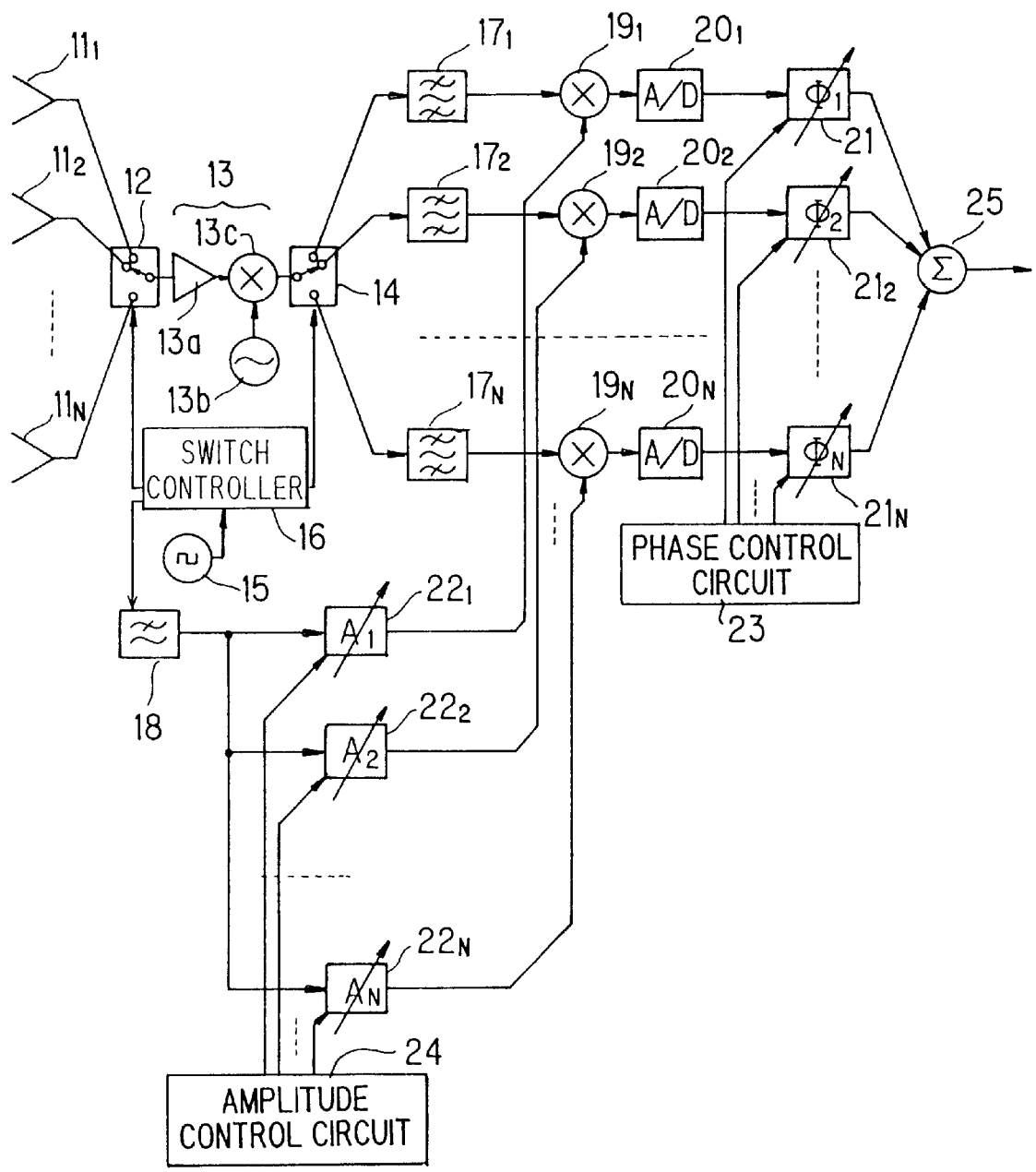
FIG. 8 is a diagram showing a radar apparatus according to a third modification of the present invention.

FIG. 8 shows a third modification in which the output side of the low-pass filter 18 is provided solely with amplitude adjusters $22_1 \sim 22_N$ for controlling the output amplitude of the low-pass filter 18. Components identical with those of the first embodiment shown in FIG. 1 are designated by like reference characters.

Figure 9:
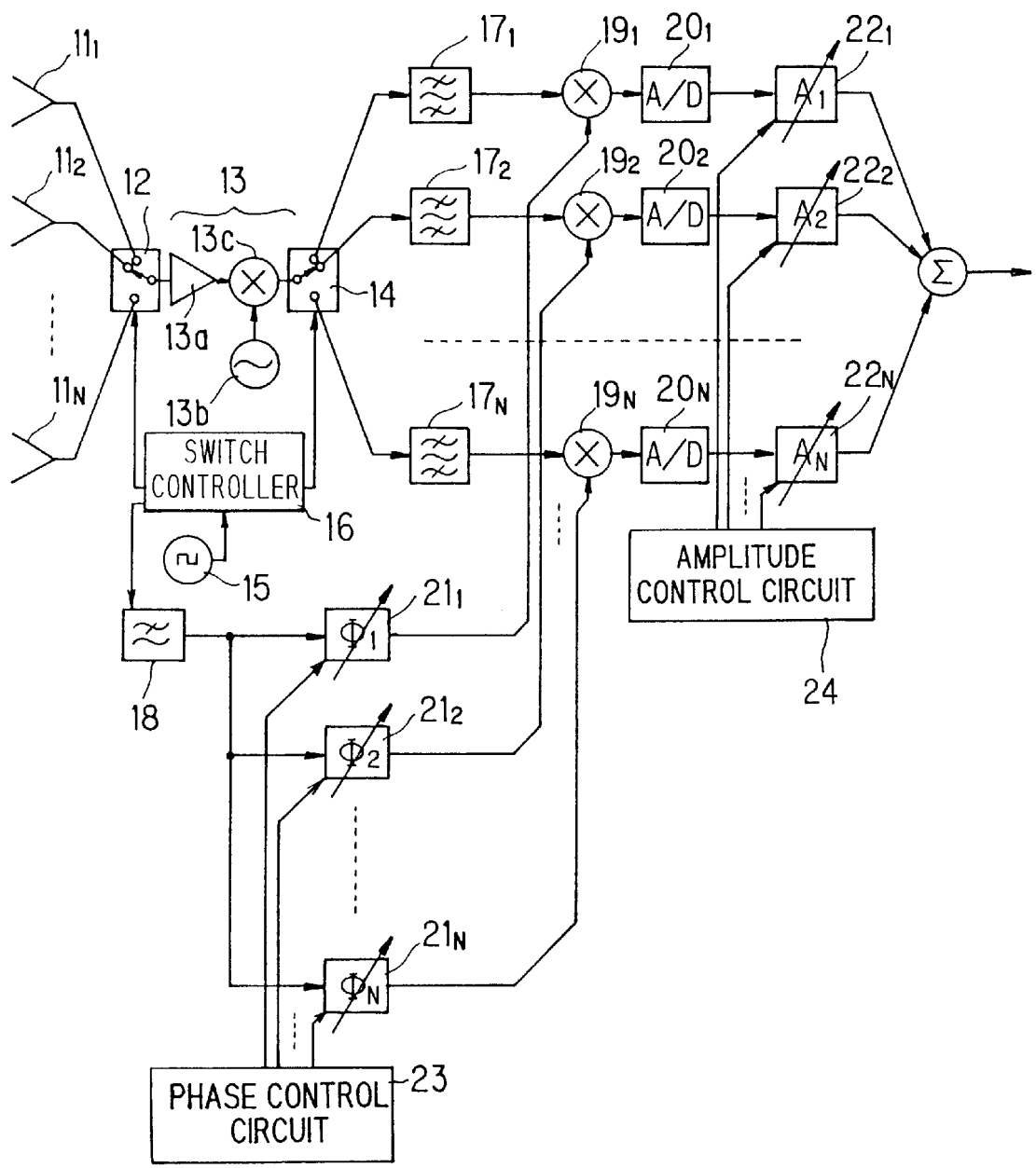
FIG. 9 is a diagram showing a radar apparatus according to a fourth modification of the present invention.

FIG. 9 shows a fourth modification in which the output side of the low-pass filter 18 is provided solely with phase shifters $21_1 \sim 21_N$ for controlling the output phase of the low-pass filter 18. Components identical with those of the first embodiment shown in FIG. 1 are designated by like reference characters.

(C) Second Embodiment (a) Configuration of second embodiment

FIG. 10 is a diagram showing the construction of a radar apparatus according to a second embodiment of the present invention. FIG. 10 illustrates primarily the receiving section. Components identical with those of the first embodiment are designated by like reference characters.

Here the second switch 14, IF filters $17_1 \sim 17_N$ and frequency converters $19_1 \sim 19_N$ of the first embodiment (FIG. 1) are eliminated and the output of the front end 13 is connected to the A/D converters $20_1 \sim 20_N$ directly. Further, the sampling control circuit 31 is provided. When the signal received by an ith antenna $11_i$ is entering the front end 13, the sampling control circuit 31 performs control in such a manner that only the A/D converter $20_i$ that corresponds to the ith antenna samples and A/D-converts the output of the front end 13.

Figure 11:
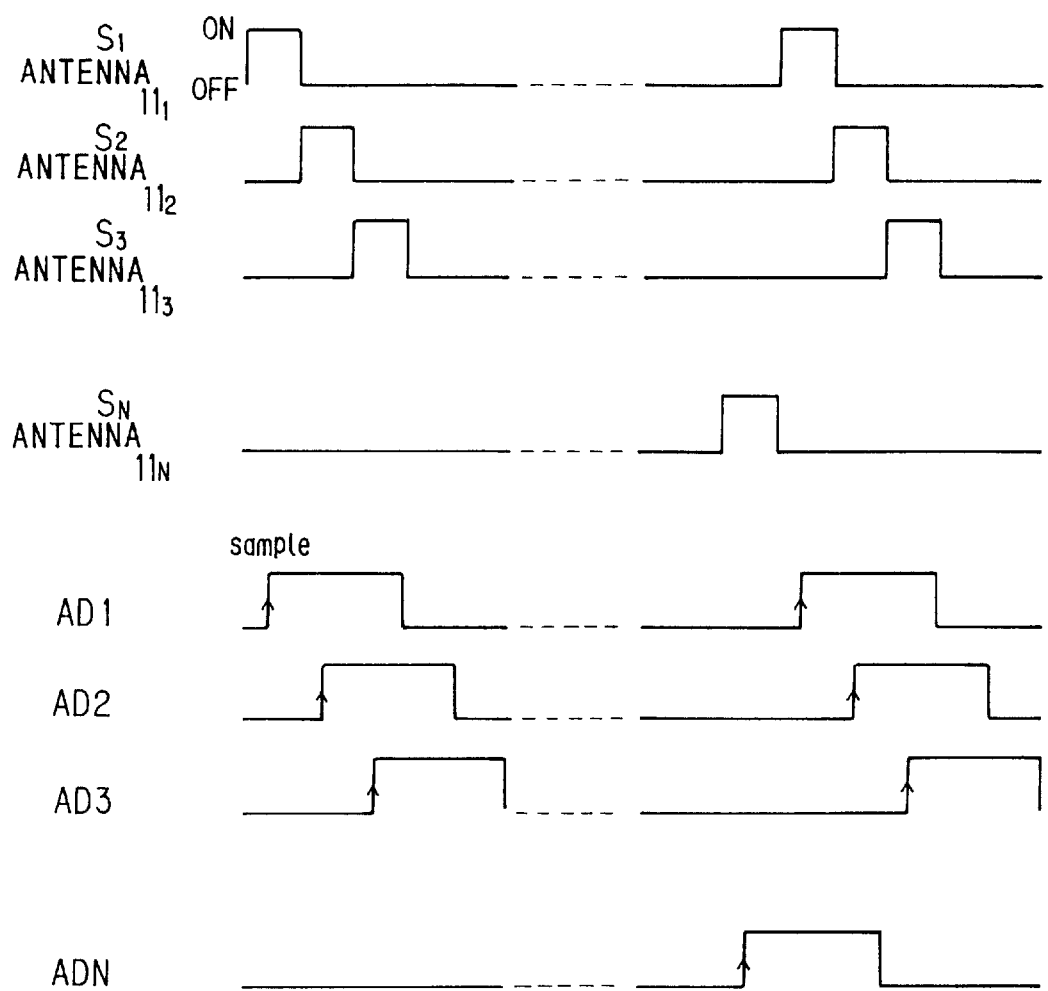
FIG. 11 is a time chart of antenna selection signals and A/D converter sampling signals.

FIG. 11 is a time chart of the antenna selection signals $S_1 \sim S_N$ which select the antennas $11_1 \sim 11_N$ and sampling signals $AD_1 \sim AD_N$ of the A/D converters $20_1 \sim 20_N$. A sampling signal $AD_i$ rises in synchronization with the leading edge of an antenna selection signal $S_i$ (i=1–N), and the A/D converter $20_i$ samples and A/D-converts the output signal of the front end 13 for a prescribed time.

If the arrangement described above is adopted, the outputs of the A/D converters $20_1 \sim 20_N$ are equivalent to what would be obtained by sampling and A/D-converting the outputs of the frequency converters $19_1 \sim 19_N$ of the first embodiment. Accordingly, the outputs of the A/D converters $20_1 \sim 20_N$ are supplied to the phase shifters $21_1 \sim 21_N$ and amplitude adjusters $22_1 \sim 22_N$, the phase-shift quantities and amplitude correction quantities of the received signals from the antennas are controlled so as to form the desired antenna radiation pattern, and these signals are combined by the adder 25. As a result, it is possible to detect a target from a desired direction.

In accordance with the second embodiment, the sampling control circuit 31 is added to the arrangement of the first embodiment but the second switch 14 and frequency converters $19_1 \sim 19_N$ are eliminated. The overall result is a reduction in the number of component parts.

(b) First modification

FIG. 12 illustrates a first modification of the second embodiment. Components identical with those of the second embodiment shown in FIG. 10 are designated by like reference characters. This modification differs from the second embodiment in that the delay circuits $32_1 \sim 32_N$ are provided between the front end 13 and respective ones of the A/D converters $20_1 \sim 20_N$. Providing the delay circuits $32_1 \cdot 32_N$ makes it possible to match the sampling and A/D conversion timings of the A/D converters $20_1 \sim 20_N$, thereby improving the accuracy of target detection.

(c) Second modification

Figure 14:
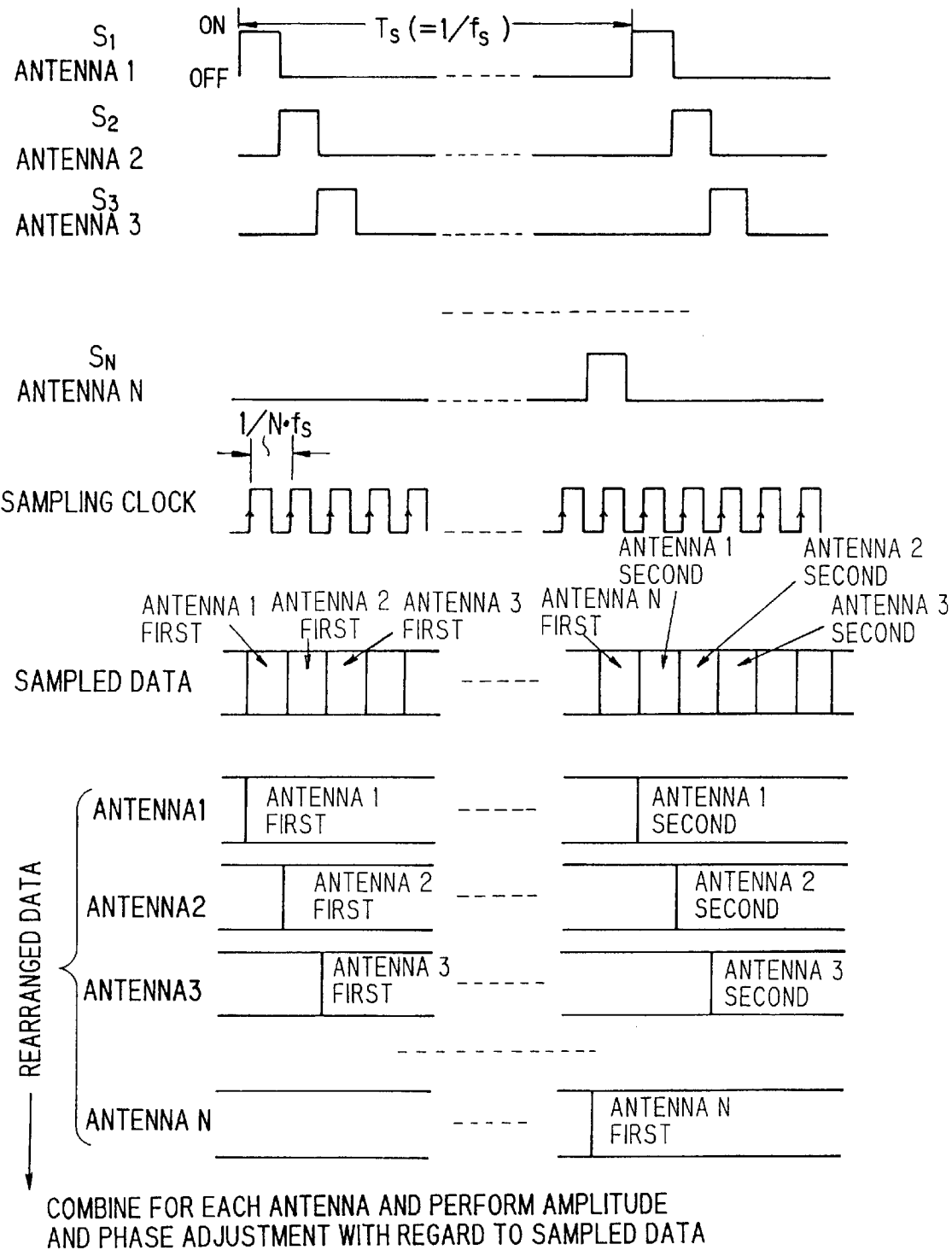
FIG. 14 is a time chart for describing the operation of the second modification.

FIG. 13 illustrates a second modification of the second embodiment, in which components identical with those of the second embodiment shown in FIG. 10 are designated by like reference characters. FIG. 14 is a timing chart useful in describing the operation of the second modification.

The second modification differs from the second embodiment in the following respects:

(1) One A/D converter 20 is provided commonly for the antennas.

(2) The A/D converter 20 samples and A/D-converts the output at a sample clock having a frequency the same as the sampling frequency N·fs of the switch 12.

(3) A/D-converted data from the A/D converter 20 enters a data rearranging unit 41 at each sampling clock.

(4) The data rearranging unit 41 rearranges the successively entered digital data in memory in the following manner: first data of the first antenna $11_1$ → first data of the second antenna $11_2$ → . . . first data of the Nth antenna $11_N$ → second data of the first antenna $11_1$ → second data of the second antenna $11_2$ → . . . second data of the Nth antenna $11_N$ → . . .

(5) The data rearranging unit 41, phase control circuit 23 and amplitude control circuit 24 are constituted by a DSP (Digital Analog Processor) which, by executing DSP processing, subjects the signals received by the antennas to the phase shifts $\phi_1 \sim \phi_N$ and amplitude adjustments $A_1 \sim A_N$ and combines the resulting signals.

In the second modification, the phase-shift quantities $\phi_1 \sim \phi_N$ and amplitude adjustment values $A_1 \sim A_N$ of the received signals from the antennas are controlled so as to form the desired antenna radiation pattern, the resulting signals are combined and the signal resulting from the combination is output, thereby making it possible to detect a target from any direction.

(D) Third Embodiment (a) Configuration

FIG. 15 shows a monopulse radar apparatus, particularly the receiver section thereof, according to a third embodiment of the present invention.

The apparatus includes first and second antennas $51_1$, $51_2$, which receive reflected electric power from a target, and the first switch 52 for alternately selecting, and connecting to the front end 53, the antennas $51_1$, $51_2$ at a frequency fs that is much higher than a baseband frequency fb. The front end 53 is provided commonly for the first and second antennas $51_1$, $51_2$ and has (1) an RF amplifier 53a for low-noise amplification of the signal received by each antenna, (2) a local oscillator 53b for outputting a local oscillation signal of frequency $f_{LO}$ (=fc−fb), where fc represents a carrier frequency and fb the baseband frequency, and (3) a mixer (frequency converter) 53c for mixing the local oscillation signal of frequency $f_{LO}$ (=fc−fb) with the RF signal output by the RF amplifier 53a and frequency-converting the RF signal to an intermediate-frequency signal.

The second switch 54, which is switched in synchronization with the first switch 52, connects the output of the front end 53 to the frequency converter that corresponds to the first or second antenna when the signal received by the first or second antenna is entering the front end 53. An oscillator 55 outputs a signal having a frequency of 2·fs. A switch controller 56 receives the signal of frequency 2·fs as an input and outputs antenna selection signals $S_1$, $S_2$ (see FIG. 2, where N=2) to control the first and second switches 52, 54.

The IF filters $57_1$, $57_2$, which are provided for respective ones of the antennas $51_1$, $51_2$, remove higher harmonics and low-frequency components from the signal that enters from the front end 53 and pass the desired intermediate-frequency components. A low-pass filter 58 converts a rectangular wave having the frequency of fs to a sinusoidal local oscillation signal and outputs this signal to the mixers (frequency converters) $59_1$, $59_2$. The latter mix the local oscillation signal (the low-pass filter output) with IF signals from the corresponding IF filters $57_1$, $57_2$ to effect a frequency conversion to other intermediate-frequency signals or baseband signals.

The A/D converters $60_1$, $60_2$ convert the outputs of the corresponding frequency converters to digital data. The phase comparator circuit 61 compares the phases of the signals received by the two antennas, and the amplitude comparator circuit 62 compares the amplitudes of the signals received by the two antennas. The arrival-direction estimating unit 63 estimates the direction of a target (the signal arrival direction) based upon a detected phase difference or amplitude difference. It should be noted that both a phase comparison and an amplitude comparison are not necessarily required, and an arrangement may be adopted in which there is only one of these comparator circuits, namely either the phase comparator circuit or the amplitude comparator circuit.

Though the two receiving antennas $51_1$, $51_2$ point in substantially the same direction, the positions at which they are placed differ slightly. Consequently, the radiation beam patterns overlap with a slight offset between them. If the target is at equal distances from both antennas, the phases of the received signals that arrive at the two antennas $51_1$, $51_2$ will be equal. If the target is closer to one antenna than the other, however, the signal arrival direction (the target direction) can be estimated from the phase difference between the two signals arriving at the respective antennas and the spacing between the antennas.

(b) Operation

The RF signals received by the antennas $51_1$, $51_2$ are alternately selected and input to the front end 53 by the first switch 52 at the frequency fs, and the output of the front end 53 is selected by the second switch 54, which performs a switching operation in synchronization with the first switch 52, whereby the output of the front end 53 is input to the frequency converters $59_1$, $59_2$ via the IF filters $57_1$, $57_2$. More specifically, the second switch 54 performs a switching operation in sync with the first switch 52 so that when a signal received by the first antenna $51_1$ or second antenna $51_2$ is entering the front end 53, the output of the front end 53 is connected to whichever of the frequency converters $51_1$, $51_2$ corresponds to the antenna receiving the input signal.

Intermittently selecting, at the frequency fs, the RF signals (carrier signals) received by the antennas $51_1$, $51_2$ is equivalent to modulating the amplitude of the RF signal (carrier signal) at the frequency fs. Accordingly, frequency components indicated by the spectrum of FIG. 3A are generated by the switching operation of the first and second switches 52, 54. If the local oscillation signal of frequency $f_{LO}$ (=fc−fb) is mixed with this signal by the mixer 53c, a signal having the spectrum distribution shown in FIG. 3B is generated. This signal is input to the IF filters $57_1$, $57_2$. The IF filters $57_1$, $57_2$ each select and output an IF signal (a signal having an intermediate frequency of fs±fb) contained in the intermediate-frequency band indicated by the dashed line in FIG. 3B. The frequency converters $59_1$, $59_2$ mix the local oscillation signal of frequency fs output by the filter 58 with the signals that enter from the IF filters $57_1$, $57_2$, respectively, demodulate the baseband signal shown in FIG. 3C and output the resulting signal.

The A/D converters $60_1$, $60_2$ convert the baseband signal demodulated by the frequency converters $59_1$, $59_2$ to digital data. The phase comparator circuit 61 obtains and outputs the phase difference φ between the reception signals that arrive at the respective antennas, and the amplitude comparator circuit 62 obtains and outputs the amplitude difference A between the reception signals that arrive at the respective antennas. The arrival-direction estimating unit 63 estimates the signal arrival direction (the target direction) from the phase difference φ, amplitude difference A and spacing between the antennas.

Thus, in accordance with the third embodiment, only the single front end 53 need be provided commonly for the two antennas. This makes it possible to simplify the arrangement and to dispense with compensating means and adjustment circuits required in the prior art.

(c) Modification

FIG. 16 illustrates a modification of the third embodiment.

Here the second switch 54, IF filters $57_1$, $57_2$ and frequency converters $59_1$, $59_2$ of the third embodiment (FIG. 15) are eliminated and the output of the front end 53 is connected to the A/D converters $60_1$, $60_2$ directly. Further, the sampling control circuit 64 is provided. When the signal received by an ith (i=1, 2) antenna $51_i$ is entering the front end 53, the sampling control circuit 64 performs control in such a manner that only the A/D converter $60_i$ that corresponds to the ith antenna samples and A/D-converts the output of the front end 53.

If the arrangement described above is adopted, the outputs of the A/D converters $60_1$, $60_2$ are equivalent to what would be obtained by sampling and A/D-converting the outputs of the frequency converters $59_1$, $59_2$ of the third embodiment. Accordingly, if the outputs of the A/D converters $60_1$, $60_2$ are supplied to the phase comparator circuit 61 and amplitude comparator circuit 62 and the phase difference φ and amplitude difference A between the reception signals that arrive at the respective antennas are obtained and output by the phase comparator circuit 61 and amplitude comparator circuit 62, the arrival-direction estimating unit 63 will estimate and output the signal arrival direction (the target direction) from the phase difference φ, amplitude difference A and spacing between the antennas.

In accordance with this modification, the sampling control circuit 64 is added to the arrangement of the third embodiment but the second switch 54 and frequency converters $59_1$, $59_2$ can be eliminated. The overall result is a reduction in the number of component parts.

(E) Fourth Embodiment

FIG. 17 is a diagram showing the construction of a radar apparatus according to a fourth embodiment in a case where antennas are used for both transmission and reception. Components identical with those of the first embodiment shown in FIG. 1 are designated by like reference characters. In the first embodiment, the antennas $11_1$~$11_N$ are used exclusively for reception. According to the fourth embodiment, however, the antennas $11_1$~$11_N$ are used for both transmission and reception.

The apparatus shown in FIG. 17 includes the transmitter circuit 71 and the third switch 72 that alternately connects whichever of the antennas $11_1$~$11_N$ has been selected by the first switch 12 to the transmitter circuit 71 and front end 13.

Figure 18:
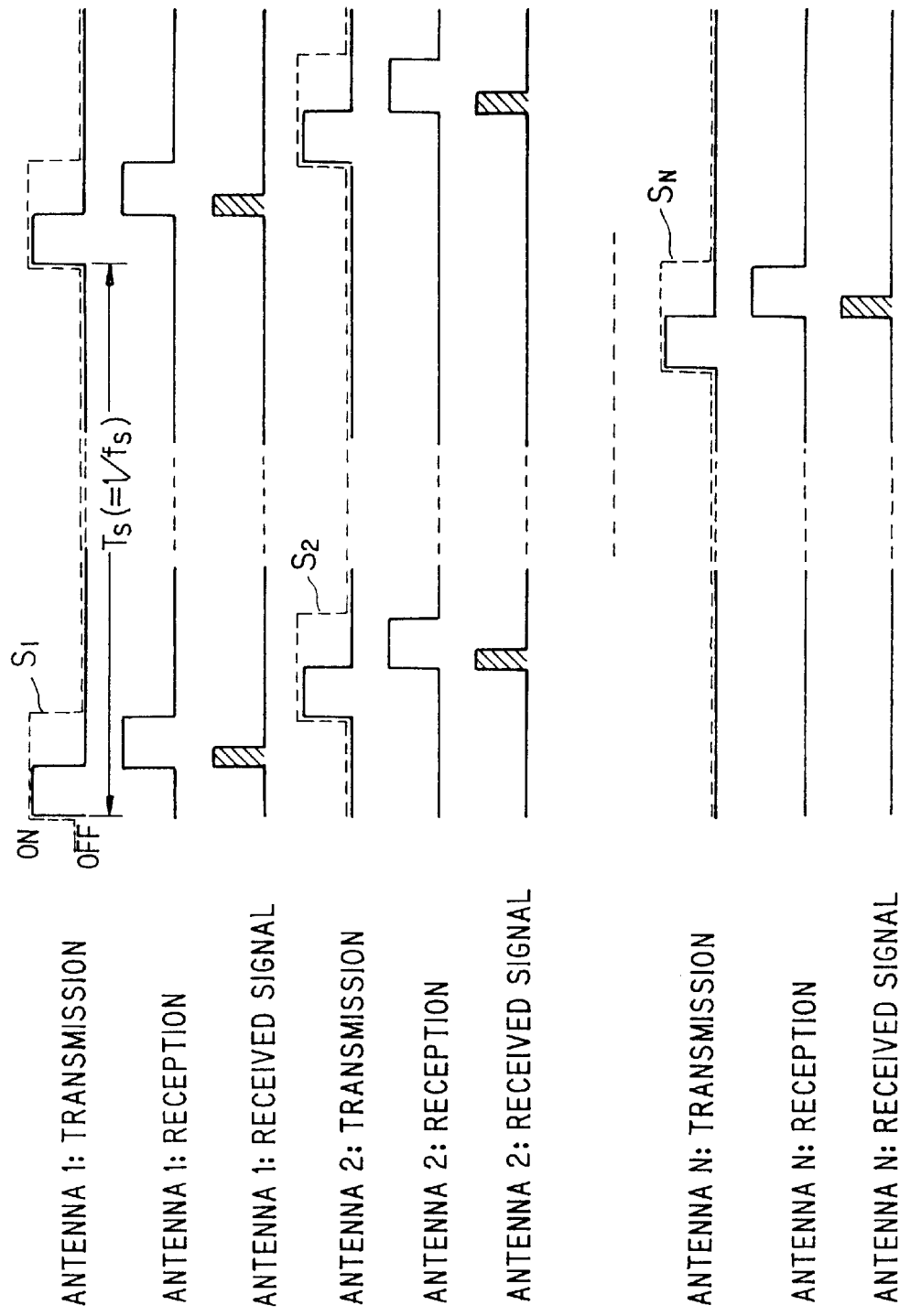
FIG. 18 is a time chart of antenna selection transmission/ reception changeover according to the fourth embodiment.

The first switch 12 cyclically selects the antennas $11_1$~$11_N$ by the antenna selection signals $S_1$~$S_N$, as indicated by the dashed lines in FIG. 18, and connects the selected antenna to the third switch 72. The third switch 72 alternately connects the antenna selected by the first switch 12 to the transmitter circuit 71 and front end 13, thereby using this antenna for both transmission and reception.

As a result of this arrangement, the antennas can be selected cyclically and used alternately for transmission/reception in the following manner: (1) transmission/reception is performed by the first antenna $11_1$, (2) then by the second antenna $11_2$, (3) then by the third through Nth antennas $11_3$~$11_N$ in succession, and (4) then again by the first antenna $11_1$ and so on. Accordingly, it suffices to provide only the single front end 13 commonly for the antennas $11_1$~$11_N$ and, moreover, each antenna can be used for both transmission and reception.

(F) Fifth Embodiment

In the fourth embodiment, all of the antennas are used for both transmission and reception. However, there are instances where only some are used for both transmission and reception and the others are used solely for reception. FIG. 19 is a diagram showing the construction of a radar apparatus according to a fifth embodiment in which only the first antenna $11_1$ is used for both transmission and reception and the other antennas $11_2$~$11_N$ are used exclusively for reception. Components identical with those of the first embodiment shown in FIG. 1 are designated by like reference characters.

Figure 20:
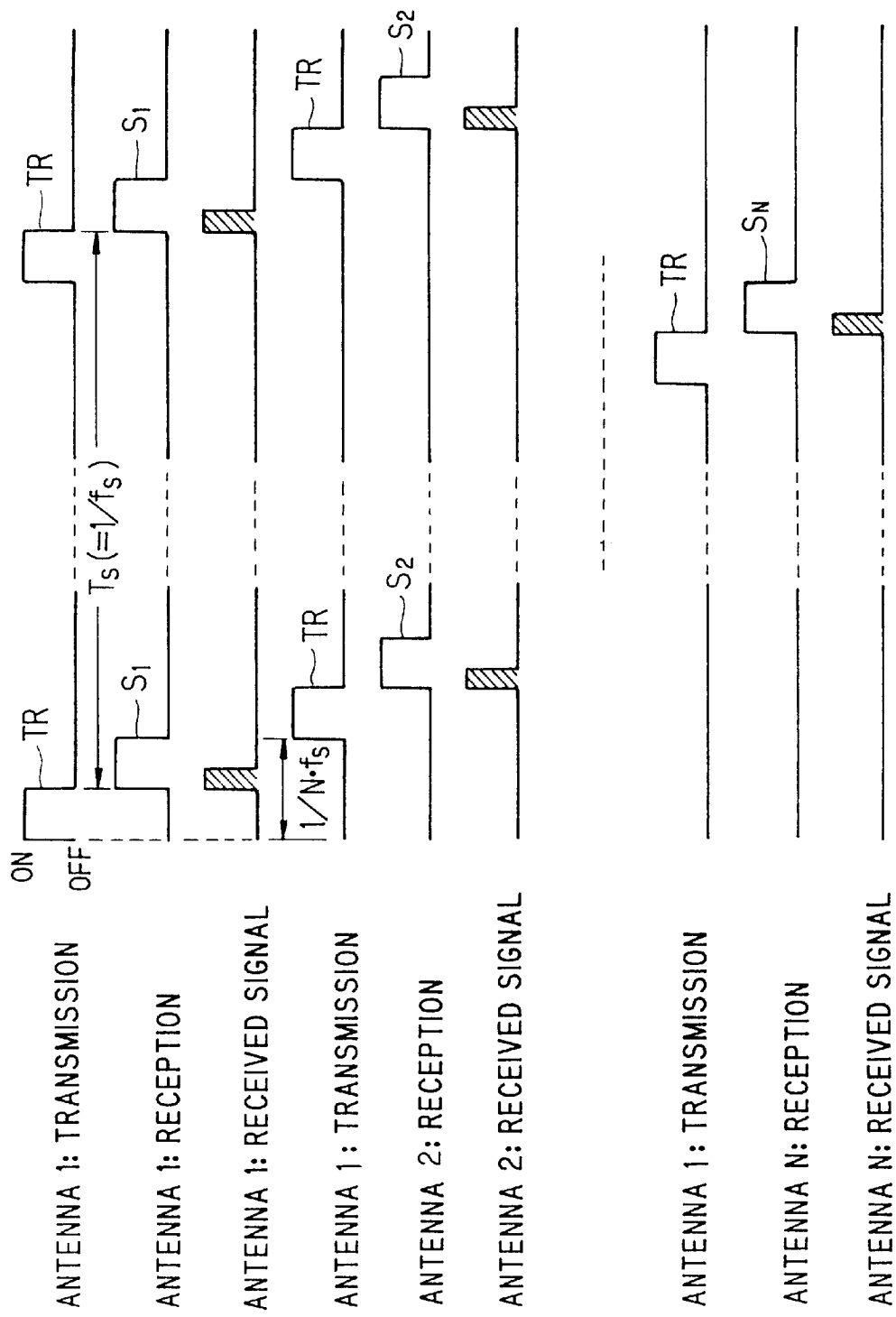
FIG. 20 is a time chart of antenna selection transmission/ reception changeover according to the fifth embodiment.

The apparatus shown in FIG. 19 includes the transmitter circuit 71 and the third switch 73 that connects the transmitter circuit 71 to the first antenna $11_1$ in alternation with the cyclic connecting of the antennas $11_1$~$11_N$ to the front end 13 by the first switch 12. More specifically, as illustrated in the time chart of FIG. 20, the antennas $11_1$~$11_N$ are cyclically connected to the front end 13, so as to be used for reception, by the first switch 12 based upon the antenna selection signals $S_1$~$S_N$ having the switching frequency fs. This operation is the reception cycle. The first antenna $11_1$, which is for both transmission and reception, is connected to the transmitter circuit 71, so as to be used for transmission, based upon a transmitter-circuit selection signal TR having the frequency N·fs. This operation is the transmission cycle. The switch controller 16 generates the antenna selection signals $S_1$~$S_N$ and the transmitter-circuit selection signal TR in such a manner that reception and transmission are performed alternately.

As a result, only the first antenna $11_1$ is used for both transmission and reception and the other antennas can be used exclusively for reception in the following manner: (1) transmission and reception are performed by the first antenna $11_1$ → (2) transmission is performed by the first antenna $11_1$ and reception by the second antenna $11_2$ → . . . (3) transmission is performed by the first antenna $11_1$ and reception by the Nth antenna $11_N$ → (4) transmission and reception are performed by the first antenna $11_N$ and so on. Only one front end need be provided for the antennas. It should be noted that although one antenna is used for both transmission and reception in this embodiment, two or more antenna can be adopted for transmission and reception if desired.

(G) Sixth Embodiment

FIG. 21 is a diagram showing the construction of a radar apparatus according to a sixth embodiment in which the antennas are used for both transmission and reception. Components identical with those of the first embodiment shown in FIG. 1 are designated by like reference characters. In the first embodiment, all of the antennas $11_1$~$11_N$ are used exclusively for reception. In the sixth embodiment, however, all of the antennas $11_1$~$11_N$ are used for both transmission and reception.

The apparatus shown in FIG. 21 includes the transmitter circuit 71, the third switches $75_1$~$75_N$ provided between the respective antennas $11_1 \sim 11_N$ and the first switch 12 for selectively connecting the antennas $11_1 \sim 11_N$ to the first switch 12 and the side of the transmitter circuit 71, and a phase/amplitude adjustment circuit 76 for adjusting the phase or amplitude of a transmission signal input to each antenna. In the transmission cycle, the third switches $75_1 \sim 75_N$ connect the phase/amplitude adjustment circuit 76 to all of the antennas $11_1 \sim 11_N$ simultaneously so that a transmission signal that has undergone a predetermined phase or amplitude correction will enter each of the antennas, whereby radio waves having the desired antenna radiation pattern are emitted.

Figure 22:
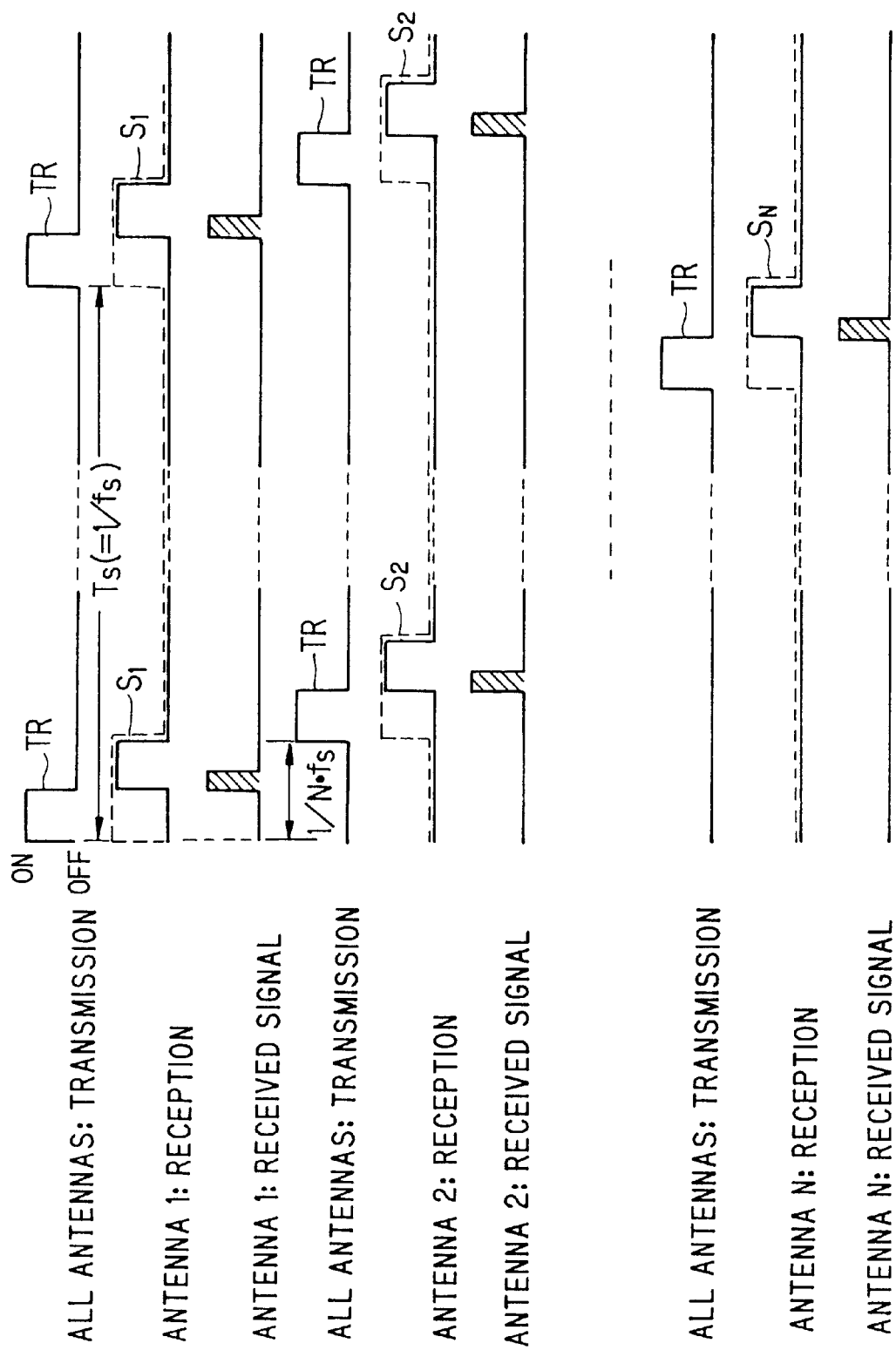
FIG. 22 is a time chart of antenna selection transmission/ reception changeover according to the sixth embodiment.

As illustrated in the time chart of FIG. 22, the switch controller 16 generates the antenna selection signals $S_1 \sim S_N$ and the transmitter-circuit selection signal TR in such a manner that reception and transmission are performed alternately. More specifically, the first switch 12 and the third switches $75_1 \sim 75_N$ cooperate to input phase- or amplitude-adjusted transmission signals to all of the antennas $11_1 \sim 11_N$ (this is the transmission cycle) and to form and emit the desired antenna radiation pattern and cyclically connect the antennas to the front end 13 in alternation with transmission (this is the reception cycle). As a result, transmission by all of the antennas and cyclic reception by each antenna are carried out alternately in the following manner: (1) transmission is performed by all of the antenna and reception by the first antenna → (2) transmission is performed by all of the antenna and reception by the second antenna → . . . (3) transmission is performed by all of the antenna and reception by the Nth antenna → (4) transmission is performed by all of the antenna and reception by the first antenna and so on.

In accordance with the sixth embodiment, only one front end need be provided for the antennas, each antenna can be used for both transmission and reception and a desired antenna radiation pattern can be formed at the time of transmission.

(H) Seventh Embodiment

FIG. 23 is a diagram showing the construction of a monopulse radar apparatus according to a seventh embodiment in which the antennas are used for both transmission and reception. Components identical with those of the third embodiment shown in FIG. 15 are designated by like reference characters. In the third embodiment, the first and second antennas $51_1$, $51_2$ are used exclusively for reception. In the seventh embodiment, however, the first and second antennas $51_1$, $51_2$ are used for both transmission and reception.

The apparatus shown in FIG. 23 includes the transmitter circuit 81 and the third switch 82 for alternately connecting whichever of the antennas $51_1$, $51_2$ has been selected by the first switch 52 to the transmitter circuit 81 and front end 53.

The first switch 52 alternately selects the antennas $51_1$, $51_2$ by the antenna selection signals S1, S2 and connects the selected antenna to the third switch 82. The latter alternately connects the antenna that has been selected by the first switch to the transmitter circuit 81 and front end 53 so that this antenna may be used for both transmission and reception.

By virtue of the foregoing operation, the first and second antennas $51_1$, $51_2$ can be selected alternately and each can be used for transmission and reception alternately in the following manner: (1) transmission/reception is performed by the first antenna $51_1$, (2) then by the second antenna $51_2$, (3) then again by the first antenna $51_1$ and (4) then again by the second antenna $51_2$. In accordance with the seventh embodiment, therefore, it suffices to provide only the single front end 53 commonly for the two antennas $51_1$, $51_2$ and, moreover, each antenna can be used for both transmission and reception.

Thus, in accordance with the present invention, only a single front end need be provided commonly for all of the antennas of a radar apparatus having an antenna array. This makes it possible to simplify the arrangement and to dispense with compensating means and adjustment circuits required in the prior art.

In accordance with the present invention, phase and amplitude adjusting means can be placed at any appropriate location, thereby making it possible to provide radar apparatus having a variety of configurations.

In accordance with the present invention, an amplitude adjustment is applied by adjusting the length of time during which an antenna is selected. This makes it possible to perform the amplitude adjustment in a simple manner.

In accordance with the present invention, the radar apparatus is so adapted that if the antennas of the apparatus are used for both transmission and reception, the antennas are selected cyclically and the selected antenna is connected to a transmitter circuit and front end in alternating fashion. As a result, only a single front end need be provided commonly for all of the antennas of the radar apparatus and, moreover, each antenna can be used for both transmission and reception.

In accordance with the present invention, the radar apparatus is so adapted that if some of the antennas are used for both transmission and reception and the other antennas are used exclusively for reception, the transmitter circuit is connected to the transmission/reception antennas in alternation with the cyclic connecting of each of the antennas to the front end. As a result, some of the antennas can be used for both transmission and reception and the other antennas can be used exclusively for reception. Moreover, only a single front end need be provided commonly for all of the antennas.

In accordance with the present invention, the radar apparatus is so adapted that each of the antennas is used for both transmission and reception, transmission by all antennas is performed in alternation with the cyclic connecting of each of the antennas to the front end, and, at the time of transmission, phase- or amplitude-adjusted transmission signals are input to all of the antennas simultaneously and transmitted. As a result, only a single front end need be provided commonly for all of the antennas, each antenna can be used for both transmission and reception and a desired antenna radiation pattern can be formed at the time of transmission.

In accordance with the present invention, an A/D converter corresponding to each antenna samples and A/D-converts the signal, which has been received by this antenna, at an antenna selection timing. This makes it possible to eliminate a second switch and frequency converters, thereby reducing the number of component parts.

In accordance with the present invention, delay circuits for delaying A/D conversion timing are provided at the inputs of A/D converters. As a result, received signals sampled at identical timings can be converted to digital data and processed. This makes it possible to improve the accuracy of target detection.

In accordance with the present invention, one A/D converter is provided commonly for all of the antennas and the A/D converter is used for sampling/AD conversion of each antenna reception signal in time-shared fashion. This makes possible a major reduction in the number of parts used, thereby simplifying the apparatus.

In accordance with the present invention, only a single front end need be provided commonly for each of the two antennas of a monopulse radar apparatus. This makes it possible to simplify the arrangement and to dispense with compensating means and adjustment circuits required in the prior art.

In accordance with the present invention, the monopulse radar apparatus is so adapted that if the two antennas of the apparatus are used for both transmission and reception, the antennas are selected alternately and the selected antenna is connected to a transmitter circuit and front end in alternating fashion. As a result, only a single front end need be provided commonly for each of the antennas of the radar apparatus and, moreover, each antenna can be used for both transmission and reception.

In accordance with the present invention, the monopulse radar apparatus is so adapted that an A/D converter corresponding to each antenna samples and A/D-converts the signal, which has been received by this antenna, at an antenna selection timing. This makes it possible to eliminate a second switch and frequency converters, thereby reducing the number of component parts.

As many apparently widely different embodiments of the present invention can be made without departing from the spirit and scope thereof, it is to be understood that the invention is not limited to the specific embodiments thereof except as defined in the appended claims.

What is claimed is:

1. An array antenna radar apparatus having a plurality of antennas, adjusting circuits provided in correspondence with respective ones of the antennas for adjusting phase or amplitude of input signals to the adjusting circuits, and a combining circuit for combining signals that have been adjusted in phase or amplitude by the adjusting circuits, the radar apparatus comprising:

a front end provided commonly for the antennas for amplifying signals, which have been received by the antennas, successively input thereto, and for frequency-converting the amplified signals to intermediate-frequency signals;

a first switch for cyclically connecting the antennas to said front end at a prescribed switching frequency;

frequency converters provided in correspondence with respective ones of the antennas for frequency-converting the intermediate-frequency signals output by said front end to other intermediate-frequency signals or baseband signals at the said switching frequency;

a second switch, which is switched in synchronization with said first switch, for coupling the output of said front end to whichever of said frequency converters corresponding to an ith antenna when the signal received by the ith antenna is entering said front end; and intermediate-frequency filters provided between said second switch and respective ones of said frequency converters;

wherein a target lying in a desired direction is detected by adjusting the phase or amplitude of an output from each frequency converter and combining the signals that result.

2. The apparatus according to claim 1, further comprising a local oscillator for outputting a local oscillation signal having a frequency identical with the switching frequency; and adjusting circuits each for adjusting phase or amplitude of the local oscillation signal being provided between said local oscillator and respective ones of said frequency converters;

wherein the local oscillation signals that have been adjusted in phase or amplitude by each of said adjusting circuits is input to the respective frequency converters, and each frequency converter outputs a signal whose phase or amplitude has been adjusted.

3. The apparatus according to claim 1, wherein an amplitude adjustment is applied to the outputs of said frequency converters by adjusting lengths of time during which the antennas are connected to said front end and lengths of time during the output of said front end is connected to the frequency converters that correspond to said antennas.

4. The apparatus according to claim 1, wherein each of the antennas is used for both transmission and reception, and the apparatus further comprises a third switch for alternately connecting an antenna, which has been selected by said first switch, to a transmitter circuit and said front end.

5. The apparatus according to claim 1, wherein at least one of the antennas is used for both transmission and reception and the other antennas are used exclusively for reception, and the apparatus further comprises a third switch for connecting, in alternation with cyclic connecting of each of the antennas to said front end, a transmitter circuit to said antenna that is for both transmission and reception.

6. The apparatus according to claim 1, wherein each of the antennas is used for both transmission and reception, and the apparatus further comprises a third switch, provided between the antennas and said first switch, for selectively connecting the antennas to said first switch and a transmitter circuit; wherein a desired antenna radiation pattern is formed by simultaneously inputting phase- or amplitude-adjusted transmission signals to the antennas in alternation with cyclic connecting of each of the antennas to said front end by said first and third switches.

7. An array antenna radar apparatus having a plurality of antennas, adjusting circuits provided in correspondence with respective ones of the antennas for adjusting phase or amplitude of input signals to the adjusting circuits, and a combining circuit for combining signals that have been adjusted in phase or amplitude by the adjusting circuits, the radar apparatus comprising:

a front end provided commonly for the antennas for amplifying signals, which have been received by the antennas, successively input thereto, and for frequency-converting the amplified signals to intermediate-frequency signals;

a switch for cyclically connecting the antennas to said front end at a prescribed switching frequency;

A/D converters provided in correspondence with respective ones of the antennas and connected to said front end for A/D-converting signals output by said front end; and a sampling control circuit for causing an ith A/D converter which corresponds to an ith antenna to sample and A/D-convert the output signal of said front end when the signal received by the ith antenna is entering said front end;

wherein a target lying in a desired direction is detected by adjusting the phase or amplitude of an output signal from each A/D converter and combining the signals that result.

8. The apparatus according to claim 7, further comprising delay circuits, which are provided in front of respective ones of said A/D converters, for making all A/D converters A/D convert at the same timing.

9. An array antenna radar apparatus having a plurality of antennas, adjusting circuit provided commonly for the antennas for adjusting phase or amplitude of input signals to the adjusting circuit, and a combining circuit for combining signals that have been adjusted in phase or amplitude by the adjusting circuit, the radar apparatus comprising:

- a front end provided commonly for the antennas for amplifying signals, which have been received by the antennas, successively input thereto, and for frequency-converting the amplified signals to intermediate-frequency signals;
- a switch for cyclically connecting the antennas to said front end at a prescribed switching frequency;
- an A/D converter for A/D-converting intermediate-frequency signals output by said front end;
- means for causing said A/D converter to A/D convert an output signal of the front end at a frequency obtained by multiplying the switching frequency by the number of the plurality of antennas, and for storing, as a signal corresponding to an ith antenna, an A/D converted output prevailing when the signal received by the ith antenna is entering said front end;
- wherein a target lying in a desired direction is detected by adjusting the phase or amplitude of an output signal, which corresponds to each antenna, from said A/D converter, and combining the signals that result.

10. A monopulse radar apparatus having two antennas, comparators for comparing phases or amplitudes of a reflected signal that arrives at the two antennas, and an arrival-direction estimating unit for estimating the arrival direction of the reflected signal based upon the results of the comparison, the apparatus comprising:

- a front end provided commonly for the antennas for amplifying signals, which have been received by the antennas, successively input thereto, and for frequency-converting the amplified signals to intermediate-frequency signals;
- a first switch for alternately connecting the antennas to said front end at a prescribed switching frequency;
- frequency converters provided in correspondence with respective ones of the antennas for frequency-converting the intermediate-frequency signals output by said front end to other intermediate-frequency signals or baseband signals at the said switching frequency;
- a second switch, which is switched in synchronization with said first switch, for coupling the output of said front end to whichever of said frequency converters corresponding to an ith antenna when the signal received by the ith antenna is entering said front end; and
- intermediate-frequency filters provided between said second switch and respective ones of said frequency converters;
- wherein arrival direction of a reflected signal is estimated by comparing phases or amplitudes of output signals from said frequency converters.

11. The apparatus according to claim 10, wherein the two antennas are used for both transmission and reception, and the apparatus further comprises a third switch for alternately connecting an antenna, which has been selected by said first switch, to a transmitter circuit and said front end.

12. A monopulse radar apparatus having two antennas, comparators for comparing phases or amplitudes of a reflected signal that arrives at the two antennas, and an arrival-direction estimating unit for estimating the arrival direction of the reflected signal based upon the results of the comparison, the apparatus comprising:

- a front end provided commonly for the antennas for amplifying signals, which have been received by the antennas, successively input thereto, and for frequency-converting the amplified signals to intermediate-frequency signals;
- a switch for alternately connecting the antennas to said front end at a prescribed switching frequency;
- A/D converters provided in correspondence with respective ones of the antennas and connected to said front end for A/D-converting signals output by said front end; and
- a sampling control circuit for causing whichever of said A/D converters corresponding to an ith antenna to sample and A/D-convert the output signal of said front end when the signal received by the ith antenna is entering said front end;
- wherein output signals of said A/D converters are compared in phases or amplitudes thereof to estimate the arrival direction of a reflected signal.

* * * * *